(12) United States Patent
Yukimoto

(10) Patent No.: US 7,832,653 B2
(45) Date of Patent: Nov. 16, 2010

(54) EXPANSION VALVE HAVING A GROOVED VALVE MEMBER AND REFRIGERATION DEVICE INCLUDING THE SAME

(75) Inventor: Tooru Yukimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 569 days.

(21) Appl. No.: 11/883,238

(22) PCT Filed: Feb. 28, 2006

(86) PCT No.: PCT/JP2006/303751

§ 371 (c)(1),
(2), (4) Date: Jul. 26, 2007

(87) PCT Pub. No.: WO2006/093149

PCT Pub. Date: Sep. 8, 2006

(65) Prior Publication Data

US 2008/0282717 A1    Nov. 20, 2008

(30) Foreign Application Priority Data

| Feb. 28, 2005 | (JP) | ............................. 2005-054979 |
| Mar. 31, 2005 | (JP) | ............................. 2005-104397 |
| Dec. 15, 2005 | (JP) | ............................. 2005-362501 |
| Dec. 15, 2005 | (JP) | ............................. 2005-362502 |

(51) Int. Cl.
*F25B 41/04* (2006.01)
*F25B 41/06* (2006.01)
*G05D 23/12* (2006.01)
*F16K 47/00* (2006.01)
*F16L 55/02* (2006.01)

(52) U.S. Cl. ..................... 236/92 B; 251/121; 251/122; 251/126; 251/333

(58) Field of Classification Search ............... 236/92 B, 236/93 R, 93 A, 92 R, 92 A; 251/121, 122, 251/126, 333
See application file for complete search history.

(56) References Cited

U.S. PATENT DOCUMENTS

| 1,112,050 | A  | * | 9/1914  | Berberich ..................... 138/43 |
| 6,397,628 | B1 | * | 6/2002  | Watanabe et al. .............. 62/509 |
| 2004/0238772 | A1 | * | 12/2004 | Bachman et al. ............ 251/126 |
| 2005/0224737 | A1 | * | 10/2005 | Mihaylov et al. ........... 251/126 |

FOREIGN PATENT DOCUMENTS

JP    5-288286 A    11/1993

(Continued)

*Primary Examiner*—Frantz F Jules
*Assistant Examiner*—Daniel C Comings
(74) *Attorney, Agent, or Firm*—Birch, Stewart, Kolasch & Birch, LLP

(57) ABSTRACT

An expansion valve includes a valve body 1. The valve body 1 includes a first throttle 5 and a second throttle 6 arranged downstream from the first throttle 5. The second throttle 6 includes an outer surface of the second valve portion 16 and an inner surface of the second valve hole 13. A helical groove or a linear groove is formed in the outer surface of the second valve portion 16 or the inner surface of the second valve hole 13. Further, at least either one of the outer surface of the second valve portion 16 and the inner surface of the second valve hole 13 is tapered toward a distal end of a valve member 4.

46 Claims, 13 Drawing Sheets

FOREIGN PATENT DOCUMENTS

| | | |
|---|---|---|
| JP | 5-322381 A | 12/1993 |
| JP | 7-146032 A | 6/1995 |
| JP | 10-205927 A | 8/1998 |
| JP | 11-325658 A | 11/1999 |
| JP | 2002-71241 A | 3/2002 |
| JP | 2002-122367 A | 4/2002 |
| JP | 2002-195698 A | 7/2002 |
| JP | 2005-69644 A | 3/2005 |
| JP | 2005-351605 A | 12/2005 |

* cited by examiner

PRIOR ART

EXPANSION VALVE HAVING A GROOVED VALVE MEMBER AND REFRIGERATION DEVICE INCLUDING THE SAME

FIELD OF THE INVENTION

The present invention relates to an expansion valve and a refrigeration device.

BACKGROUND OF THE INVENTION

A separate-type air conditioner conventionally includes a refrigeration circuit shown for example in FIG. 23. The refrigeration circuit includes a compressor 201, an outdoor coil 202, an expansion valve 203, and an indoor coil 204. The compressor 201 and the outdoor coil 202 are accommodated in an outdoor unit 205. The expansion valve 203 and the indoor coil 204 are accommodated in an indoor unit 206. An electric expansion valve, such as that shown in FIG. 24, is used as the expansion valve 203.

The electric expansion valve includes a valve body 210, in which an inlet port 211 and an outlet port 212 are formed. A valve chamber 213 and a refrigerant flow passage 214 are formed in the valve body 210. The valve chamber 213 and the refrigerant flow passage 214 communicate the inlet port 211 with the outlet port 212. The valve body 210 has a partition wall 216 in which a valve hole 217 is formed. A valve member 215 is accommodated in the valve chamber 213 in a manner that its distal end faces the valve hole 217 of the partition wall 216. The valve member 215 has a distal end portion that defines a tapered portion 218. A throttle 219 is formed by the tapered portion 218 and the valve hole 217. The valve member 215 advances and retracts with respect to the valve hole 217 when driven by a drive unit, such as a pulse motor (not shown). The advancement and retraction of the valve member 215 adjusts the open degree of the valve hole 217 (the throttling amount of the throttle 219).

A cooling operation cycle in the separate-type air conditioner will now be described with reference to FIG. 23. High-pressure gas refrigerant compressed by the compressor 201 first flows to the outdoor coil 202, where the refrigerant, which exchanges heat with the ambient air, condenses and liquefies. The liquid refrigerant enters the valve body 210 of the expansion valve 203 via a liquid tube 207 and the inlet port 211. The refrigerant entering the valve body 210 flows to the indoor coil 204 via the throttle 219 and the outlet port 212. The refrigerant sent to the indoor coil 204, which exchanges heat with the indoor air, evaporates and vaporizes into low-pressure gas refrigerant, which returns to the compressor 201.

In the separate-type air conditioner, bubbles may be formed in the liquid tube 207 connecting the outdoor coil 202 and the expansion valve 203 depending on the installment condition or driving condition of the air conditioner. If the bubbles coalesce and produce a slug flow or plug flow in the refrigerant, the refrigerant may flow alternately in a liquid phase and in a gaseous phase through the throttle 219. This increases velocity fluctuations and pressure fluctuations in the refrigerant. In this case, the refrigerant flow may generate noise near the outlet of the expansion valve 203. The same problem also occurs in a heat-pump air conditioner during a heating operation.

To reduce pulsations in the refrigerant flow, in one conventional method (conventional method A), an aggregate of narrow passages near the outlet of a throttle and rectifies the refrigerant flow. More specifically, patent document 1 discloses a structure in which a porous member or an aggregate of capillaries is arranged near a throttle. Patent document 2 discloses a structure in which a honeycomb pipe formed by a bundle of capillaries or a molecular sieve is arranged near the outlet of a throttle. Further, another conventional method (conventional method B) changes the shape of a flow passage near an outlet of a throttle. More specifically, patent document 1 discloses a structure in which the inner diameter of the vicinity of an outlet of an orifice, which forms a valve hole, is formed so as to increase in steps or in a continuous manner by providing a tapered form and arranging grooves in the inner surface of the valve hole. A further conventional method (conventional method C) forms a throttle with a two-step structure and generates an intermediate pressure between the two steps to disperse the kinetic energy of the refrigerant. More specifically, patent document 3 discloses the structure in which a two-stepped orifice is arranged in a throttle of a refrigerant flow passage. Further, patent document 4 discloses another method (conventional method D) in which a throttle has a single-step structure, with the throttle being formed by a plurality of refrigerant flow passages.

Patent Document 1: Japanese Laid-Open Patent Publication No. 7-146032

Patent Document 2: Japanese Laid-Open Patent Publication No. 11-325658

Patent Document 3: Japanese Laid-Open Patent Publication No. 5-322381

Patent Document 4: Japanese Laid-Open Patent Publication No. 5-288286

SUMMARY OF THE INVENTION

However, the conventional method A has a problem in that the extremely narrow passages are easily clogged with foreign matter. Further, the porous member, the honeycomb pipe, the capillaries, and the molecular sieve, which all have low mechanical strength, deform easily. This lowers the reliability of the electric expansion valve.

The conventional method B has a problem in that the ejection velocity of the vaporized refrigerant flowing through the throttle cannot be kept constant. Further, bubbles in the refrigerant cannot be broken up and uniformly dispersed. For these reasons, noise generated by the refrigerant flow cannot be sufficiently reduced.

The conventional method C requires the throttle, which is located at the downstream side, to increase the flow resistance of the refrigerant. This increases the ejection velocity of the refrigerant at the vicinity of the outlet of the expansion valve. Further, the throttle having the two-step structure is formed by an orifice having a short passage length. When the pressure greatly changes near the throttle, which is located at the upstream side, the ejection velocity of the refrigerant changes greatly near the outlet of the expansion valve. Thus, the effect for reducing noise is not sufficient. Further, it is difficult to fully close the two throttles at the same time. Thus, there is a problem in that an intermediate pressure between the two throttles cannot be generated and maintained when fully closing the throttles.

The throttle of the conventional method D has a large flow passage area. Thus, the flow amount of the refrigerant cannot be accurately controlled. If the cross-sectional area of each refrigerant flow passage forming the throttle is reduced to solve this problem, the refrigerant flow passages may easily clog with or catch foreign matter.

It is an object of the present invention to provide an expansion valve and a refrigeration device including a expansion valve that reduce the noise generated when a two-phase refrigerant of gaseous and liquid phases passes through a throttle without lowering the reliability of the expansion valve.

To solve the above problems, a first aspect of the present invention provides an expansion valve including a valve body, an inlet port and an outlet port formed in the valve body, a valve chamber formed in the valve body, a refrigerant flow passage formed in the valve body and connecting the inlet port and the outlet port through the valve chamber, a valve member accommodated in the valve chamber, a first throttle formed in the refrigerant flow passage, and a second throttle formed in the refrigerant flow passage downstream from the first throttle. The valve body has a first partition wall partitioning a refrigerant flow in the refrigerant flow passage and a second partition wall partitioning a refrigerant flow downstream from the first partition wall, with the first partition wall including a first valve hole and the second partition wall including a second valve hole. The valve member is formed from a rod-shaped member, and the rod-shaped member has an outer surface including a first valve portion forming the first throttle with the first valve hole and a second valve portion forming the second throttle with the second valve hole. The first throttle has an open degree that is variable by advancing and retracting the first valve portion with respect to a valve seat of the first valve hole. A groove is formed in an outer surface of the second valve portion or an inner surface of the second valve hole. At least either one of the outer surface of the second valve portion and the inner surface of the second valve hole is tapered toward a distal end of the valve member. The second throttle includes a passage formed between the groove and the outer surface of the second valve portion or the inner surface of the second valve hole that faces the groove.

The above structure including the first throttle and the second throttle arranged downstream from the first throttle reduces the decompressing amount of the first throttle when a slug flow or plug flow is generated in the expansion valve and reduces the ejection energy of the refrigerant near the first throttle. Further, the second throttle rectifies the refrigerant flow that passes through the first throttle. As a result, refrigerant flows from the second throttle to the pipe at a lower velocity and with a smaller kinetic energy. This structure reduces the velocity fluctuations and the pressure fluctuations of the refrigerant and reduces noise generated by the refrigerant flow near the outlet of the expansion valve.

Further, at least either one of the outer surface of the second valve portion and the inner surface of the second valve hole is tapered toward the distal end of the valve member. Thus, when the open degree of the first throttle decreases, the open degree of the second throttle also decreases. In this state, the second throttle easily traps foreign matter. However, when the open degree of the first throttle increases, the open degree of the second throttle also increases. Thus, the trapped foreign matter is easily washed off by the refrigerant. As described above, the above structure prevents clogging caused by foreign matter. This prevents problems such as defective operations of the valve member.

In the above expansion valve, preferably, the first throttle is fully closable by advancing and retracting the first valve portion with respect to the valve seat of the first valve hole. In this case, the first throttle can be fully closed. This enables the first throttle to have a sufficient throttling amount for fully closing the first throttle.

In the above expansion valve, preferably, the outer surface of the second valve portion and the inner surface of the second valve hole are both tapered toward the distal end of the valve member. In this case, when the open degree of the second throttle is increased, the varying amount of the gap formed between one of the surfaces that includes the groove and the other one of the surfaces facing that one surface decreases. This enables the passage forming the second throttle to function effectively for the refrigerant irrespective of the open degree of the second throttle. Accordingly, even when the open degree of the second throttle is increased, the velocity fluctuations and the pressure fluctuations of the refrigerant are effectively reduced.

In the above expansion valve, preferably, the outer surface of the second valve portion and the inner surface of the second valve hole are tapered at the same angle. When, for example, the groove is a helical groove, the cross-sectional area of the refrigerant flow passage formed by the helical groove does not vary greatly in accordance with the open degree of the valve. This effectively breaks up bubbles in the refrigerant in a stable manner.

In the above expansion valve, preferably, the groove is formed in the outer surface of the second valve portion. This facilitates machining of the groove.

In the above expansion valve, preferably, the valve member has a distal end portion defining the first valve portion and an intermediate portion defining the second valve portion. In this case, the outer diameter of the second valve portion increases. This alleviates design limitations such as the entire length or the number of the groove. In this case, the expansion valve is easily designed to reduce the velocity fluctuations and the pressure fluctuations of the refrigerant.

In the above expansion valve, preferably, an enlarged space portion is formed in the refrigerant flow passage between the first throttle and the second throttle. In this case, a refrigerant flow that passes through the first throttle easily generates a vortex in the enlarged space portion. The generation of the vortex reduces the kinetic energy of the refrigerant flow and effectively reduces the velocity fluctuations and the pressure fluctuations of the refrigerant.

In the above expansion valve, preferably, the first valve portion includes a guide portion for deflecting refrigerant flow that passes through the first valve hole in the enlarged space portion. This enhances the generation of a vortex in the enlarged space portion. Thus, kinetic energy of the refrigerant flow ejected from the first throttle is easily reduced, and velocity fluctuations and pressure fluctuations of the refrigerant flowing in the second throttle are reduced.

In the above expansion valve, preferably, the groove is a helical groove, and the second throttle is formed by a helical passage formed between the helical groove and the outer surface of the second valve portion or the inner surface of the second valve hole that faces the helical groove. In this case, the entire length of the passage forming the second throttle is increased. Thus, the kinetic energy of the refrigerant is reduced effectively. This further effectively reduces the velocity fluctuations and the pressure fluctuations of the refrigerant.

In the above expansion valve, preferably, the valve member includes a distal end portion defining the first valve portion and an intermediate portion defining the second valve portion. The second valve portion and the inner surface of the second valve hole are tapered toward the distal end of the valve member. The groove is a helical groove, and the second valve portion has a downstream end portion arranged in the second valve hole within a range from a minimum value to a maximum value of the open degree of the second throttle. This structure prevents the rectified refrigerant flow in the second throttle from being disturbed in an unnecessary manner.

In the above expansion valve, preferably, the valve member has a distal end portion defining the first valve portion and an intermediate portion defining the second valve portion. The outer surface of the second valve portion and the inner surface of the second valve hole are tapered toward the distal end of the valve member. The groove is a helical groove. An enlarged space portion is formed near an inlet of the second valve hole in the refrigerant flow passage between the first throttle and the second throttle. The second valve portion has an upstream end portion arranged in the enlarged space portion within a range from a minimum value to a maximum value of the open degree of the second throttle. In this case, the refrigerant flow that passes through the first throttle generates a vortex in the enlarged space portion. This structure effectively reduces the kinetic energy of the refrigerant flow, and further reduces noise generated by the refrigerant flow.

In the above expansion valve, preferably, the helical groove is formed in the outer surface of the second valve portion. This facilitates machining of the helical groove.

In the above expansion valve, preferably, the second valve portion and the second valve hole are tapered at the same angle. In this case, when the open degree of the second throttle is increased, the varying amount of the gap formed between one of the surfaces that includes the groove and the other one of the surfaces facing that one surface decreases. This enables the helical passage forming the second throttle to function effectively for the refrigerant irrespective of the open degree of the second throttle.

In the above expansion valve, preferably, the tapering angle of the first valve portion is greater than the tapering angle of the second valve hole. In this case, the first throttle varies its throttling effect more than the second throttle as the valve member advances and retracts.

In the above expansion valve, preferably, the tapering angle of the second valve hole is in a range of 5 to 60 degrees. In this case, foreign matter trapped in the gap between the thread of the helical groove and the inner surface of the second valve hole is removed when the second throttle is fully open.

In the above expansion valve, preferably, a gap formed between the first valve portion and the first valve hole near an outlet of the first throttle is smaller than a minimum value of a gap formed between the second valve portion and the second valve hole of the second throttle. In this case, the first throttle varies its throttling effect more than the second throttle. This further prevents clogging caused by foreign matter.

In the above expansion valve, preferably, a connecting portion is arranged on the valve member downstream from the second valve portion. The connecting portion has a diameter that is smaller than the diameter of a largest outer part of the second valve portion. This lowers the velocity of the refrigerant flowing from the second throttle to the pipe and prevents the refrigerant flow from being disturbed near the outlet port.

In the above expansion valve, preferably, the valve member includes a second varying diameter joint portion formed between the connecting portion and the second valve portion, with the second varying diameter joint portion being tapered from the largest outer part toward the connecting portion. This structure prevents the refrigerant rectified in the second throttle from being disturbed and further reduces noise generated by the refrigerant flow.

In the above expansion valve, preferably, a first varying diameter joint portion is formed between an upstream end portion of the second valve portion and a downstream end portion of the first valve portion, with the first varying diameter joint portion being tapered from the second valve portion toward the first valve portion, and the tapering angle of the first varying diameter joint portion being greater than the tapering angle of the first valve portion. In this case, the first and second valve holes are easily formed to have diameters suitable for the valve holes.

In the above expansion valve, preferably, the second valve portion is tapered toward the distal end of the valve member by forming the helical groove on the outer surface of the rod-shaped member and then cutting the top of a thread of the helical groove. In this case, the cross-sectional area of the helical groove decreases as the open degree of the second throttle decreases. In this case, the length of the helical groove and the cross-sectional area of the helical groove adjust the open degree of the second throttle.

In the above expansion valve, preferably, the second valve portion is formed by tapering the outer surface of the rod-shaped member toward the distal end of the valve member and then machining the helical groove in the outer surface of the rod-shaped member. In this case, a surface defined by the connecting the top of the thread is easily formed as a tapered surface.

In the above expansion valve, preferably, the helical groove includes a plurality of helical grooves. In this case, the refrigerant ejected from the first throttle is dispersed in the plurality of helical passages. This disperses the kinetic energy of the refrigerant flow. Further, the refrigerant flowing out of the helical passages has different velocity fluctuations and pressure fluctuations. Thus, the plurality of refrigerant flows from out of the helical passages collide with one another, and the velocity fluctuations and the pressure fluctuations of one refrigerant flow and the velocity fluctuations cancel one another. This effectively reduces noise generated by the refrigerant flow.

In the above expansion valve, preferably, the valve seat protrudes from a wall surface of the first partition wall in the vicinity of the first valve hole. This enhances the generation of a vortex near the first valve hole and further reduces the kinetic energy of the refrigerant flow ejected from the first throttle. Thus, the velocity fluctuations and the pressure fluctuations of the refrigerant flowing to the second throttle are further reduced.

In the above expansion valve, preferably, the groove includes a plurality of linear grooves extending in an advancing and retracting direction of the valve member, and the second throttle includes a plurality of independent linear passages formed between the linear grooves and a surface facing the linear grooves. In this case, the refrigerant ejected from the first throttle is dispersed in the linear passages. This disperses the kinetic energy of the refrigerant flow. Further, the refrigerant flowing from the helical passages has different velocity fluctuations and pressure fluctuations. Thus, the plurality of refrigerant flows from the linear passages collide with one another and cancel the velocity fluctuations and the pressure fluctuations with one another. This structure effectively reduces noise generated by the refrigerant flow.

Further, the length of overlapping portions of the groove and the inner surface of the second valve hole or the outer surface of the second valve portion is varied by advancing and retracting the valve member. This enables the flow resistance of the refrigerant in the first throttle and the flow resistance of the refrigerant in the second throttle to be changed at the same time. Thus, the ratio of the refrigerant flow resistance of the first throttle and the refrigerant flow resistance of the second throttle is maintained in an optimum range. This stably reduces noise generated by the refrigerant flow near the outlet of the expansion valve.

In the above expansion valve, preferably, the linear grooves are formed at regular intervals. In this case, the refrigerant flow is uniformly dispersed in the linear grooves. This maximizes the dispersing effect of the energy of the refrigerant.

To solve the above problems, a second aspect of the present invention is a refrigeration device including the above expansion valve. This realizes a refrigeration device that reduces noise generated by the refrigerant flow.

A third aspect of the present invention is an expansion valve including a valve body, a refrigerant flow passage formed in the valve body, a valve member accommodated in the valve body and formed from a rod-shaped member, a first throttle formed in the refrigerant flow passage, and a second throttle formed in the refrigerant flow passage upstream from the first throttle. The valve body has a first partition wall partitioning a refrigerant flow in the refrigerant flow passage and a second partition wall partitioning a refrigerant flow upstream from the first partition wall, with the first partition wall including a first valve hole and the second partition wall including a second valve hole. The valve member has a tapered outer surface. The valve member includes a first valve portion contactable with a valve seat of the first valve hole and a second valve portion facing an inner surface of the second valve hole. The first throttle has an open degree that is variable by advancing and retracting the first valve portion with respect to the first valve hole. The second throttle is formed by a helical passage defined between a helical groove formed in an outer surface of the second valve portion or an inner surface of the second valve hole and the outer surface of the second valve portion or the inner surface of the second valve hole. At least either one of the outer surface of the second valve portion and the inner surface of the second valve hole is tapered toward a distal end of the valve member.

The above structure breaks up bubbles in the refrigerant as the refrigerant passes through the second throttle when a slug flow or plug flow is generated near an inlet of the expansion valve. This enables the refrigerant to flow continuously toward the first throttle. The helical passage forming the second throttle has a long length and reduces the pressure fluctuations of the refrigerant caused by the two-phase flow of gaseous and liquid phases and breaks up bubbles in the refrigerant flow. The synergetic effect of the breaking up of the bubbles and the reduction of the pressure fluctuations of the refrigerant result in a continuous flow of the refrigerant from the second throttle to the first throttle. Further, the refrigerant flowing linearly from the second throttle to the second throttle further reduces the pressure fluctuations of the refrigerant in the first throttle. As a result, noise generated by the refrigerant flow near the first throttle is reduced.

Further, at least one of the outer surface of the second valve portion and the inner surface of the second valve hole is a tapered surface. In this case, when the open degree of the first throttle decreases, the open degree of the second throttle decreases. In this state, the second throttle easily traps foreign matter. However, when the open degree of the first throttle increases, the open degree of the second throttle increases. This easily washes off the trapped foreign matter with the refrigerant. Thus, clogging caused by foreign matter is avoided, and problems such as defective operations of the valve member are prevented.

In the above expansion valve, preferably, the first throttle is fully closable by advancing and retracting the first valve portion with respect to the valve seat of the first valve hole. In this case, the first throttle can be fully closed. This enables the first throttle to have a sufficient throttling amount for fully closing the first throttle.

In the above expansion valve, preferably, the outer surface of the second valve portion and the inner surface of the second valve hole are both tapered toward the distal end of the valve member. In this case, when the open degree of the second throttle is increased, the varying amount of the gap formed between one of the surfaces that includes the groove and the other one of the surfaces facing that one surface decreases. This enables the passage forming the second throttle to function effectively for the refrigerant irrespective of the open degree of the second throttle. Accordingly, even when the open degree of the second throttle is increased, the velocity fluctuations and the pressure fluctuations of the refrigerant are effectively reduced.

In the above expansion valve, preferably, the outer surface of the second valve portion and the inner surface of the second valve hole are tapered at the same angle. In this case, the cross-sectional area of the helical passage does not vary greatly in accordance with the open degree of the valve. Thus, this stably breaks up bubbles in the refrigerant.

In the above expansion valve, preferably, the helical groove is formed in the outer surface of the second valve portion. This facilitates the machining of the groove.

In the above expansion valve, preferably, the valve member has a distal end portion defining the first valve portion and an intermediate portion defining the second valve portion. In this case, the outer diameter of the second valve portion is large. This alleviates design limitations on the entire length or the number of the groove. Thus, velocity fluctuations and pressure fluctuations of the refrigerant in the second throttle are further reduced.

In the above expansion valve, preferably, an enlarged space portion is formed near an inlet of the first valve hole in the refrigerant flow passage between the second throttle and the first valve hole. In this case, a refrigerant flow that passes through the first throttle easily generates a vortex generated in the enlarged space portion. The vortex reduces the kinetic energy of the refrigerant flow and further reduces the velocity fluctuations and the pressure fluctuations of the refrigerant.

In the above expansion valve, preferably, the valve member has a distal end portion defining the first valve portion and an intermediate portion defining the second valve portion. The outer surface of the second valve portion and the inner surface of the second valve hole are tapered toward the distal end of the valve member. The second valve portion has an upstream end portion arranged in the second valve hole within a range from a minimum value to a maximum value of the open degree of the second throttle. This prevents the refrigerant flow rectified in the second throttle from being disturbed in an unnecessary manner.

In the above expansion valve, preferably, the valve member has a distal end portion defining the first valve portion, the valve member has an intermediate portion defining the second valve portion, the outer surface of the second valve portion and the inner surface of the second valve hole are tapered toward the distal end of the valve member, an enlarged space portion is formed near an inlet of the first valve hole in the refrigerant flow passage between the second throttle and the first valve hole, and the second valve portion has a downstream end portion arranged in the enlarged space portion within a range from a minimum value to a maximum value of the open degree of the second throttle. In this case, a vortex is generated in a refrigerant flow that passes through the first throttle in the enlarged space portion. This effectively reduces the kinetic energy of the refrigerant flow and further reduces the velocity fluctuations and the pressure fluctuations of the refrigerant.

In the above expansion valve, preferably, the helical groove is formed in the outer surface of the second valve portion. This facilitates the machining of the helical groove.

In the above expansion valve, preferably, the second valve portion and the second valve hole are tapered at the same angle. In this case, when the open degree of the second throttle is increased, the varying amount of the gap formed between one of the surfaces that includes the groove and the other one of the surfaces facing that one surface decreases. This enables the helical passage forming the second throttle to function effectively for the refrigerant irrespective of the open degree of the second throttle.

In the above expansion valve, preferably, the tapering angle of the first valve portion is greater than the tapering angle of the second valve hole. In this case, the first throttle varies its throttling effect more than the second throttle when the valve member advances and retracts.

In the above expansion valve, preferably, the tapering angle of a tapered surface in the second valve hole is in a range of 5 to 60 degrees. In this case, foreign matter trapped in the gap formed between the thread of the helical groove and the inner surface of the second valve hole is removed when the second throttle is fully open.

In the above expansion valve, preferably, a gap formed between the first valve portion and the first valve hole near an inlet of the first throttle is smaller than a minimum value of a gap formed between the second valve portion and the second valve hole of the second throttle. In this case, the first throttle varies its throttling effect more than the second throttle. This further prevents clogging caused by foreign matter.

In the above expansion valve, preferably, a connecting portion is formed in the valve member upstream from the second valve portion, with the connecting portion having a diameter that is smaller than a diameter of a largest outer part of the second valve portion. This lowers the velocity of the refrigerant flowing from the second throttle to the pipe and prevents the refrigerant flow near the inlet port from being disturbed in an unnecessary manner.

In the above expansion valve, preferably, a second varying diameter joint portion is formed between the connecting portion and the second valve portion, with the second varying diameter joint portion being tapered from the largest outer part of the second valve portion toward an outer part of the connecting portion. This prevents the refrigerant rectified in the second throttle from being disturbed and further reduces noise generated by the refrigerant flow.

In the above expansion valve, preferably, a first varying diameter joint portion is formed between a downstream end portion of the second valve portion and an upstream end portion of the first valve portion, with the first varying diameter joint portion being tapered from the second valve portion toward the first valve portion, and the tapering angle of the first varying diameter joint portion being greater than the tapering angle of the first valve portion. In this case, the first and second valve holes are easily formed having diameters suitable for the valve holes.

In the above expansion valve, preferably, the helical groove is formed by forming the outer surface of the second valve portion or the inner surface of the second valve hole parallel to a central axis of the valve member, then threading the outer surface of the second valve portion or the inner surface of the second valve hole, and further cutting a top of a thread of the outer surface of the second valve portion or the inner surface of the second valve hole so that a surface defined by the top of the thread forms a tapered surface. Thus, the open degree of the second throttle may be adjusted by the length of the helical groove and the cross-sectional area of the helical groove.

In the above expansion valve, preferably, the helical groove is formed by tapering an outer surface of the valve member and threading the machined surface. In this case, the surface defined by connecting the top of the thread of the helical groove is easily formed into a tapered surface.

In the above expansion valve, preferably, the valve seat protrudes from a wall surface of the first partition wall in the vicinity of the first valve hole. In this case, the refrigerant ejected from the first throttle is dispersed in the plurality of helical passages. This disperses the kinetic energy of the refrigerant flow. Further, the refrigerant flowing from the helical passages has different velocity fluctuations and pressure fluctuations. Thus, the refrigerant flows from the helical passages collide with one another, and the velocity fluctuations and the pressure fluctuations of the refrigerant flow cancel one another. This effectively reduces noise generated by the refrigerant flow.

In the above expansion valve, preferably, the helical groove includes a plurality of helical grooves. This disturbs the refrigerant and further breaks up the bubbles in the refrigerant. Thus, noise generated by the refrigerant flow is further reduced. Further, even when some of the helical grooves are clogged with foreign matter, the other helical grooves permit the refrigerant to flow. This improves the reliability of the expansion valve with regard to clogging caused by foreign matter.

To solve the above problems, a fourth aspect of the present invention is a refrigeration device including the above expansion valve. This realizes a refrigerant device that reduces noise generated by the refrigerant flow.

DETAILED DESCRIPTION OF THE PREFERRED EMBODIMENTS

First Embodiment

An expansion valve according to a first embodiment of the present invention will now be described with reference to FIG. 1.

Figure 1:
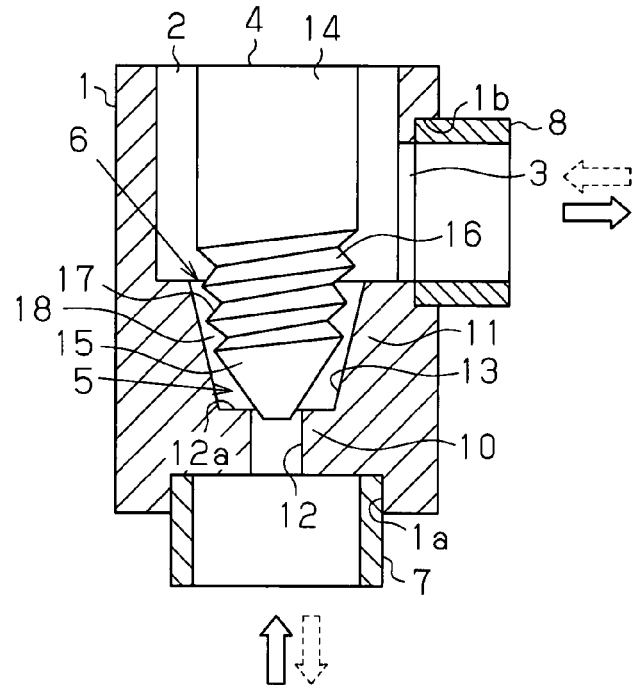
FIG. 1 is a partial cross-sectional view of an expansion valve according to a first embodiment of the present invention.

As shown in FIG. 1, the expansion valve includes a valve body 1, in which an inlet port 1a and an outlet port 1b are formed. The valve body 1, which is substantially cylindrical, and includes a valve chamber 2 and a refrigerant flow passage 3 formed in the valve body 1. In the valve body 1, the valve chamber 2 and the refrigerant flow passage 3 communicate the inlet port 1a with the outlet port 1b. A valve member 4 is accommodated in the valve chamber 2. A first throttle 5 is arranged in the refrigerant flow passage 3 at an upstream side. A second throttle 6 is arranged in the refrigerant flow passage at a downstream side. A liquid tube 7 connecting an outdoor coil and the expansion valve is connected to the inlet port 1a. A pipe 8 connecting the expansion valve and an indoor coil is connected to the outlet port 1b. In the present embodiment, the inlet port 1a is formed in a lower portion of the valve body 1, and the outlet port 1b is formed in a side wall of the valve body 1. Refrigerant flows in the valve body 1 the direction indicated by an arrow drawn with a solid line in FIG. 1.

In the valve body 1, a first partition wall 10 is formed at a position corresponding to the first throttle 5, and a second partition wall 11 is formed at a position corresponding to the second throttle 6. The first and second partition walls 10 and 11 both extend in a direction intersecting with the refrigerant flow. A first valve hole 12 is formed in the first partition wall 10. A second valve hole 13 having a larger diameter than the first valve hole 12 is formed in the second partition wall 11. The refrigerant flow passage 3 is tapered from the second partition wall 11 (second valve hole 13) toward the first partition wall 10 (first valve hole 12).

The valve member 4 includes an upper portion defining a substantially cylindrical connecting portion 14, an intermediate portion defining a second valve portion 16, and a lower portion defining a first valve portion 15. The first valve portion 15 is substantially conical. The valve member 4 is coaxial with the valve body 1 and supported to be movable in the vertical direction. The valve member 4 is connected to a pulse motor (not shown) by the connecting portion 14. The first valve portion 15 is tapered toward its distal end. The valve member 4 advances and retracts with respect to a valve seat 12a of the first valve hole 12. The advancement and retraction of the valve member 4 changes the open degree (throttling amount) of the first throttle 5, which is formed between the first valve portion 15 and the valve seat 12a.

A helical groove is formed on the outer surface of the second valve portion 16. The helical groove 17 is formed by conically shaping the second valve portion 16 and then threading the outer surface of the second valve portion 16. Thus, the portion of the outer surface of the second valve portion 16 threaded to form the helical groove 17 is tapered. The taper angle of the outer surface of the second valve portion 16 is smaller than the taper angle of the outer surface of the first valve portion 15. In the present embodiment, the outer surface of the second valve portion 16, the inner surface of the second valve hole 13, and a helical passage 18 form the second throttle 6. The helical passage 18 is defined by the space formed by the helical groove 17 of the second valve portion 16 and the inner surface of the second valve hole 13. The taper angle of the outer surface of the second valve portion 16 is the same as the taper angle of the inner surface of the second valve hole 13. In this case, the outer surface of the second valve portion 16 and the inner surface of the second valve hole 13 are parallel to each other.

The first embodiment has the advantages described below.

(1) Liquid refrigerant, which flows through the inlet port 1a, is first decompressed in the first throttle 5 and then in the second throttle 6. The refrigerant decompressed in the second throttle 6 is discharged out of the outlet port 1b and into the pipe. This structure including the first throttle 5 and the second throttle 6, which is arranged downstream from the first throttle 5, reduces the decompressing amount of the first throttle 5 when a slug flow or plug flow is generated near the inlet port 1a and reduces the ejection energy of the refrigerant near the first throttle 5. Further, the second throttle 6 rectifies the refrigerant flow that has passed through the first throttle 5. As a result, the refrigerant flows from the second throttle 6 to the pipe at a lower velocity. Accordingly, the refrigerant flowing at a lower velocity has a smaller kinetic energy. This structure reduces velocity fluctuations and pressure fluctuations in the refrigerant and reduces noise generated by the refrigerant flow near the outlet of the expansion valve.

(2) The second throttle 6 is formed by the helical passage 18. This increases the entire length of the second throttle 6. Thus, the kinetic energy of the refrigerant flow is effectively reduced. This structure reduces the velocity fluctuations and the pressure fluctuations of the refrigerant and further reduces noise generated by the refrigerant flow near the outlet of the expansion valve.

(3) The outer surface of the second valve portion 16 and the inner surface of the second valve hole 13 are both tapered toward the distal end of the valve member 4. In this case, when the open degree of the first throttle 5 decreases, the gap formed between the second valve portion 16 and the second valve hole 13 is minimized. In this state, foreign matter is easily trapped in the gap. However, when the open degree of the first throttle 5 is increased, the gap increases accordingly. In this state, the trapped foreign matter is washed off by the refrigerant. This structure prevents clogging caused by foreign matter and avoids problems such as defective operations of the valve member 4.

(4) The outer surface of the second valve portion 16 and the inner surface of the second valve hole 13 are parallel to each other. Thus, the gap formed between the second valve portion 16 and the second valve hole 13 does not change greatly as the open degree of the second throttle 6 changes. This structure further effectively reduces the velocity fluctuations and the pressure fluctuations of the refrigerant flowing through the helical passage 18 not only when the open degree of the second throttle 6 is small but also when the open degree of the second throttle 6 is large.

(5) The helical groove 17 forming the helical passage 18 is formed in the outer surface of the second valve portion 16. This facilitates the machining of the helical groove 17. Further, the helical groove 17 is formed by tapering the distal end of a rod-shaped member and then threading the tapered surface of the distal end of the rod-shaped member. This facilitates the machining of the tapered surface.

(6) The valve member 4 has the distal end portion defining the first valve portion 15 and the intermediate portion defining the second valve portion 16. Thus, the outer diameter of the second valve portion 16 is large. This alleviates design limitations on the length, width, and depth of the helical groove 17. In this case, the helical groove 17 forming the second throttle 6 is easy to design.

(7) Extremely narrow passages is not used as the throttle as in the conventional method A. Thus, the throttle is prevented from being clogged with foreign matter. Further, the first throttle 5 may be closed. This enables the first throttle 5 to have a sufficiently large throttling amount required to fully close the first throttle 5.

(8) The refrigerant flow passage 3 is partitioned by the first and second partition walls 10 and 11. The single valve member 4 is driven to adjust the open degrees of the first and second valve holes 12 and 13 of the first and second partition walls 10 and 11. The first throttle 5 is formed between the first valve hole 12 and the first valve portion 15. The second throttle 6 including the helical passage 18 is formed between the second valve hole 13 and the second valve portion 16. This simplifies the structure of the expansion valve including the two-step throttle.

Second Embodiment

A second embodiment of the present invention will now be described with reference to FIG. 2. In an expansion valve of the second embodiment, refrigerant flows in a direction opposite to the direction of the refrigerant flow in the first embodiment.

Figure 2:
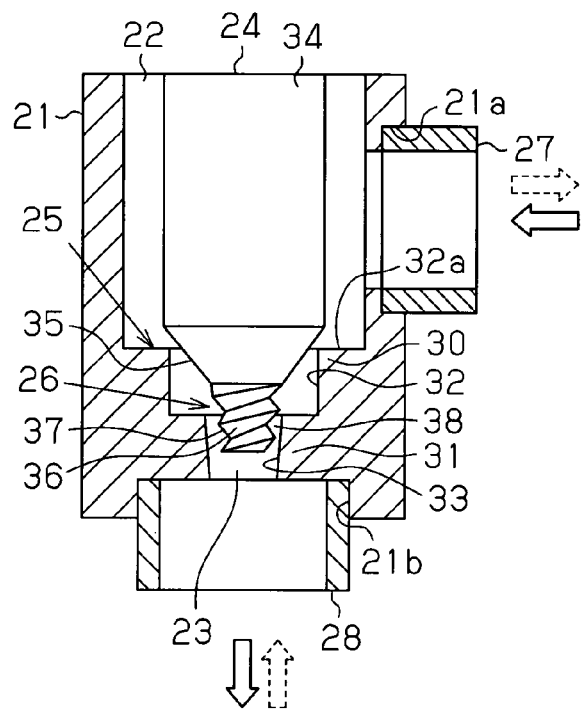
FIG. 2 is a partial cross-sectional view of an expansion valve according to a second embodiment of the present invention.

As shown in FIG. 2, the expansion valve includes a valve body 21, in which an inlet port 21a and an outlet port 21b are formed. The valve body 21, which is substantially cylindrical, and has a valve chamber 22 and a refrigerant flow passage 23 formed inside the valve body 21. In the valve body 21, the valve chamber 22 and the refrigerant flow passage 23 communicate the inlet port 21a with the outlet port 21b. A valve member 24 is accommodated in the valve chamber 22. A first throttle 25 is arranged in the refrigerant flow passage 23 at an upstream side. A second throttle 26 is arranged in the refrigerant flow passage 23 at a downstream side. A liquid tube 27 connecting an outdoor coil and the expansion valve is connected to the inlet port 21a. A pipe 28 connecting the expansion valve and an indoor coil is connected to the outlet port 21b. In the present embodiment, the inlet port 21a is formed in a side wall of the valve body 21, and the outlet port 21b is formed in a lower portion of the valve body 21. Refrigerant flows in the valve body 21 in the direction indicated by an arrow drawn with a solid line in FIG. 2.

In the valve body 21, a first partition wall 30 is formed at a position corresponding to the first throttle 25, and a second partition wall 31 is formed at a position corresponding to the second throttle 26. The first and second partition walls 30 and 31 extend in a direction intersecting with the refrigerant flow. A second valve hole 33 is formed in the second partition wall 31. A first valve hole 32 having a larger diameter than the second valve hole 33 is formed in the first partition wall 30. An inner surface of the second valve hole 33 is tapered toward the outlet port 21b.

The valve member 24 includes an upper portion defining a connecting portion 34, an intermediate portion defining a first valve portion 35, and a lower portion defining a second valve portion 36. The valve member 24 is coaxial with the valve body 21 and movably supported in the vertical direction. The valve member 24 is connected to a pulse motor (not shown) by the connecting portion 34. The first valve portion 35 is tapered toward its distal end. The valve member 24 advances and retracts with respect to a valve seat 32a of the first valve hole 32. The advancement and retraction of the valve member 24 changes the open degree (throttling amount) of the first throttle 25 formed between the first valve portion 35 and the valve seat 32a.

A helical groove is formed on an outer surface of the second valve portion 36. The helical groove 37 is formed by conically shaping the second valve portion 36 and then threading the tapered surface of the second valve portion 36. Thus, the taper angle of the outer surface of the second valve portion 36 is smaller than the taper angle of the outer surface of the first valve portion 35. In the present embodiment, the outer surface of the second valve portion 36, the inner surface of the second valve hole 33, and a helical passage 38 form the second throttle 26. The helical passage 38 is defined by the space between the helical groove 37 of the second valve portion 36 and the inner surface of the second valve hole 33. The taper angle of the outer surface of the second valve portion 36 is the same as the taper angle of the inner surface of the second valve hole 33. In this case, the outer surface of the second valve portion 36 and the inner surface of the second valve hole 33 are parallel to each other.

The second embodiment has the advantages described below.

(1) The liquid refrigerant flows through the inlet port 21a and is first decompressed in the first throttle 25 and then in the second throttle 26. The refrigerant decompressed in the second throttle 26 is discharged out of the outlet port 21b and into the pipe. This structure, which includes the first throttle 25 and the second throttle 26 arranged downstream from the first throttle 25, reduces the decompressing amount of the first throttle 25 when a slug flow or plug flow is generated near the inlet port 21a and decreases the ejection energy of the refrigerant near the first throttle 25. Further, the second throttle 26 rectifies the refrigerant that has passed through the first throttle 25. As a result, the refrigerant flows from the second throttle 26 to the pipe at a lower velocity. Accordingly, the refrigerant flowing at a lower velocity has a smaller kinetic energy. This structure reduces the velocity fluctuations and the pressure fluctuations of the refrigerant and reduces noise generated by the refrigerant flow near the outlet of the expansion valve.

(2) The second throttle 26 is formed by the helical passage 38. This increases the entire length of the second throttle 26.

Thus, the kinetic energy of the refrigerant flow is effectively reduced. This structure reduces the velocity fluctuations and the pressure fluctuations of the refrigerant and further reduces noise generated by the refrigerant flow near the outlet of the expansion valve.

(3) The outer surface of the second valve portion 36 and the inner surface of the second valve hole 33 are both tapered toward the distal end of the valve member 24. In this case, when the open degree of the first throttle 25 decreases, the gap formed between the second valve portion 36 and the second valve hole 33 decreases accordingly. In this state, foreign matter is easily trapped in the gap. However, when the open degree of the first throttle 25 is increased, the gap increases accordingly. In this state, the trapped foreign matter is washed off by the refrigerant. This structure prevents clogging caused by foreign matter and avoids problems such as defective operations of the valve member 24.

(4) The outer surface of the second valve portion 36 and the inner surface of the second valve hole 33 are parallel to each other. Thus, the gap formed between the second valve portion 36 and the second valve hole 33 does not change greatly as the open degree of the second throttle 26 changes. This structure further effectively reduces the velocity fluctuations and the pressure fluctuations of the refrigerant flowing through the helical passage 38 not only when the open degree of the second throttle 26 is small but also when the open degree of the second throttle 26 is large.

(5) The helical groove 37 is formed in the outer surface of the second valve portion 36. Further, the helical groove 37 is formed by tapering the distal end of a rod-shaped member and threading the tapered surface of the distal end of the rod-shaped member. This facilitates the machining of the tapered surface.

(6) Extremely narrow passages are not used as a throttle as in the conventional method A. This prevents the throttle from being clogged with foreign matter. Further, the first throttle 25 can be fully closed. This enables the first throttle 25 to have a sufficiently large throttling amount required to fully close the first throttle 25.

(7) The refrigerant flow passage 23 is partitioned by the first and second partition walls 30 and 31. The single valve member 24 is driven to adjust the open degrees of the first and second valve holes 32 and 33 of the first and second partition walls 30 and 31. The first throttle 25 is formed between the first valve hole 32 and the first valve portion 35. The second throttle 26 including the helical passage 38 is formed between the second valve hole 33 and the second valve portion 36. This simplifies the structure of the expansion valve including the two-step throttle.

Third Embodiment

An expansion valve according to a third embodiment of the present invention will now be described with reference to FIG. 3. The components of the expansion valve of the third embodiment that are the same as the components in the first embodiment are given the same reference numerals as those components and will not be described in detail.

Figure 3:
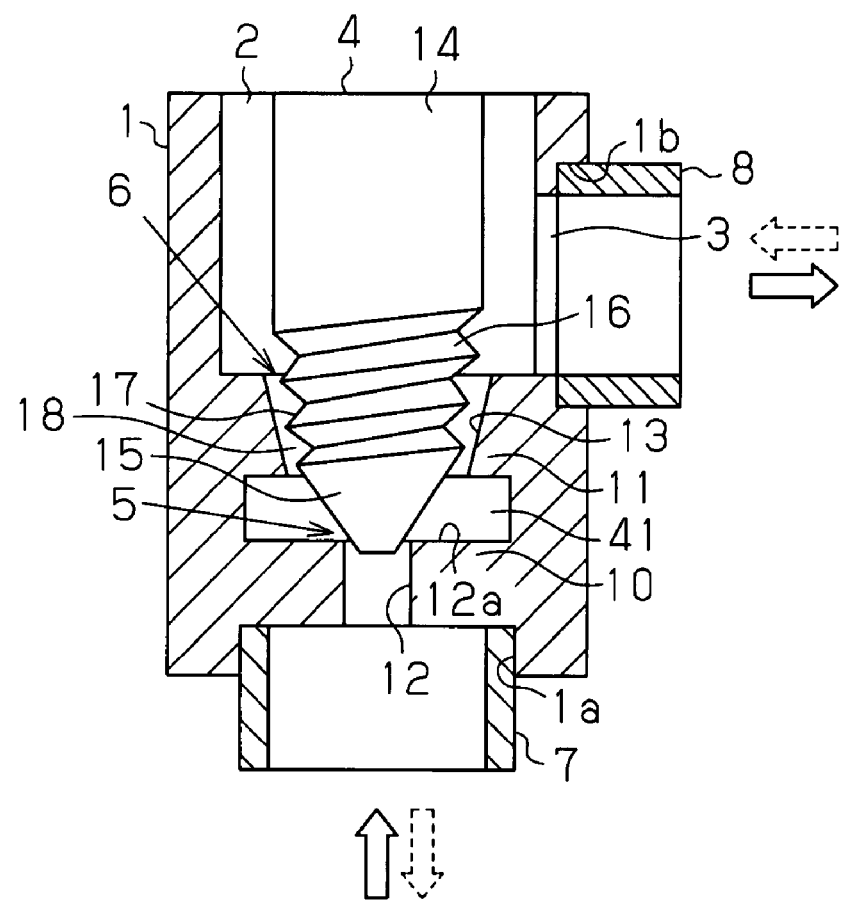
FIG. 3 is a partial cross-sectional view of an expansion valve according to a third embodiment of the present invention.

As shown in FIG. 3, a refrigerant flow passage 3 includes an enlarged space portion 41 formed between a first valve hole 12 and a second throttle 6. The enlarged space portion 41 is formed by increasing the inner diameter of part of the refrigerant flow passage 3. With this structure, the flow of refrigerant that has passed through a first throttle 5 generates a vortex in the enlarged space portion 41. The vortex effectively reduces the kinetic energy of the refrigerant flow. This structure further reduces the velocity fluctuations and the pressure fluctuations of the refrigerant flow and further reduces noise generated by the refrigerant flow near the outlet of the expansion valve.

Fourth Embodiment

An expansion valve according to a fourth embodiment of the present invention will now be described with reference to FIG. 4. The components of the expansion valve of the fourth embodiment that are the same as the components in the third embodiment are given the same reference numerals as those components and will not be described in detail.

Figure 4:
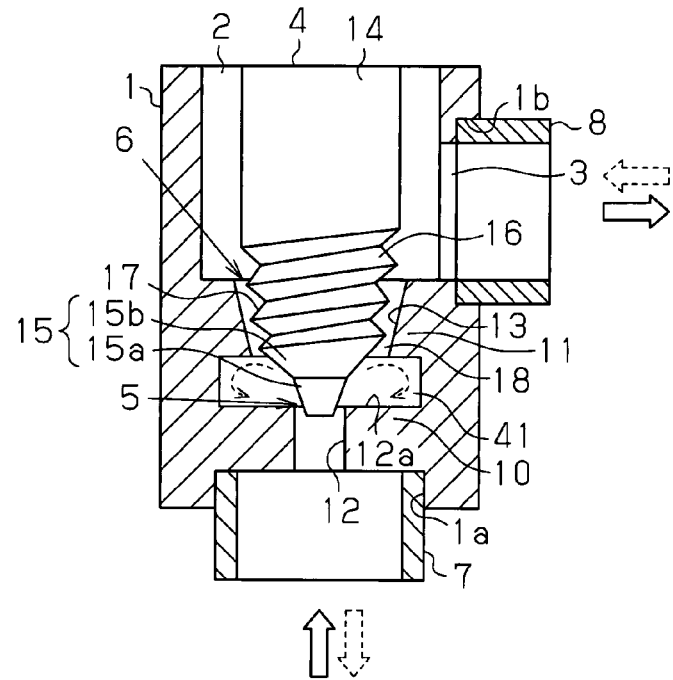
FIG. 4 is a partial cross-sectional view of an expansion valve according to a fourth embodiment of the present invention.

As shown in FIG. 4, a first valve portion 15 includes a distal end defining a first tapered portion 15a. The first valve portion 15 further includes a second tapered portion 15b formed at a basal side of the first tapered portion 15a. The taper angle of the first tapered portion 15a is smaller than the taper angle of the second tapered portion 15b. In the present embodiment, the tapered portions 15a and 15b form a tapered surface portion that functions as a guide portion. With this structure, the guide portion deflects the flow of refrigerant that has passed through a first valve hole 12 with an enlarged space portion 41 (an arrow drawn with a broken line in FIG. 4). This accelerates the generation of a vortex in the enlarged space portion 41 and more further reduces the kinetic energy of the refrigerant flow that has passed through a first throttle 5. Thus, this structure further reduces the kinetic energy, the velocity fluctuations and pressure fluctuations of the refrigerant flow flowing from a second throttle 6 to a pipe, and the noise generated by the refrigerant flow near the outlet of the expansion valve.

Fifth Embodiment

An expansion valve according to a fifth embodiment of the present invention will now be described with reference to FIG. 5. The components of the expansion valve of the fifth embodiment that are the same as the components in the first embodiment are given the same reference numerals as those components and will not be described in detail.

Figure 5:
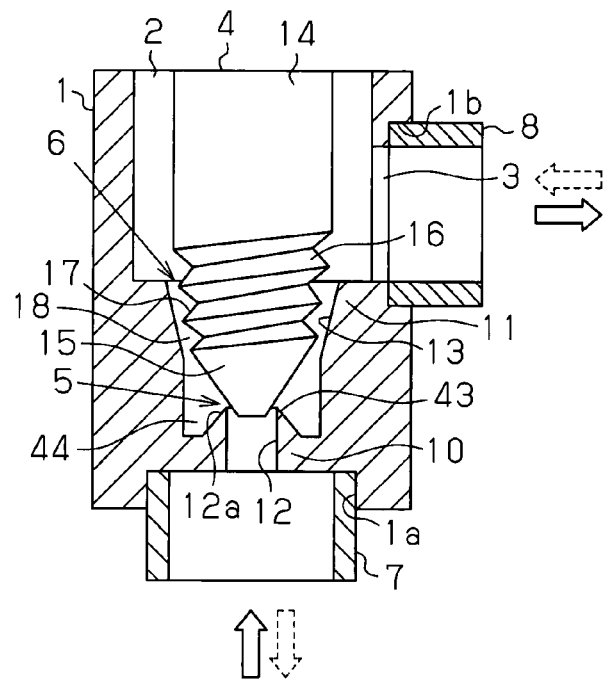
FIG. 5 is a partial cross-sectional view of an expansion valve according to a fifth embodiment of the present invention.

As shown in FIG. 5, a valve seat 43 formed by a wall surface of a first partition wall 10 protruding upward is arranged around a first valve hole 12. A vortex generation space 44 is formed between the valve seat 43 and a wall surface of a refrigerant flow passage 3. With this structure, the flow of refrigerant that has passed through a first throttle 5 generates a vortex in the vortex generation space 44. The vortex further reduces the kinetic energy of the refrigerant flow. This structure further reduces the kinetic energy, the velocity fluctuations and pressure fluctuations of the refrigerant flowing from a second throttle 6 to a pipe, and the noise generated by the refrigerant flow near the outlet of the expansion valve.

Sixth Embodiment

An expansion valve according to a sixth embodiment of the present invention will now be described with reference to FIG. 6. The components of the expansion valve of the sixth embodiment that are the same as the components in the first embodiment are given the same reference numerals as those components and will not be described in detail.

Figure 6:
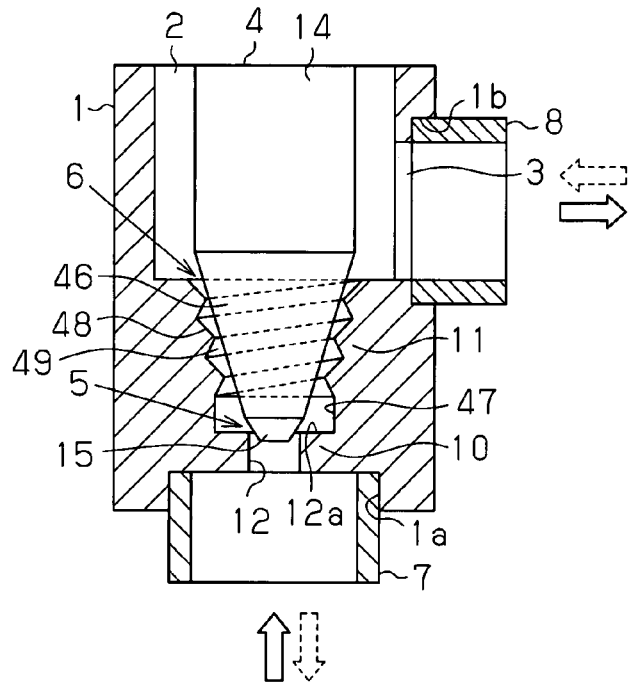
FIG. 6 is a partial cross-sectional view of an expansion valve according to a sixth embodiment of the present invention.

As shown in FIG. 6, a second valve portion 46 has an outer surface, which is smooth and tapered, and a second valve hole 47 has an inner surface, which includes a helical groove 48. In this case, the space between the helical groove 48 and the outer surface of the second valve portion 46 defines a helical passage 49. This structure has the same advantages as the first embodiment.

Seventh Embodiment

An expansion valve according to a seventh embodiment of the present invention will now be described with reference to FIG. 7. The components of the expansion valve of the seventh embodiment that are the same as the components in the second embodiment are given the same reference numerals as those components and will not be described in detail.

Figure 7:
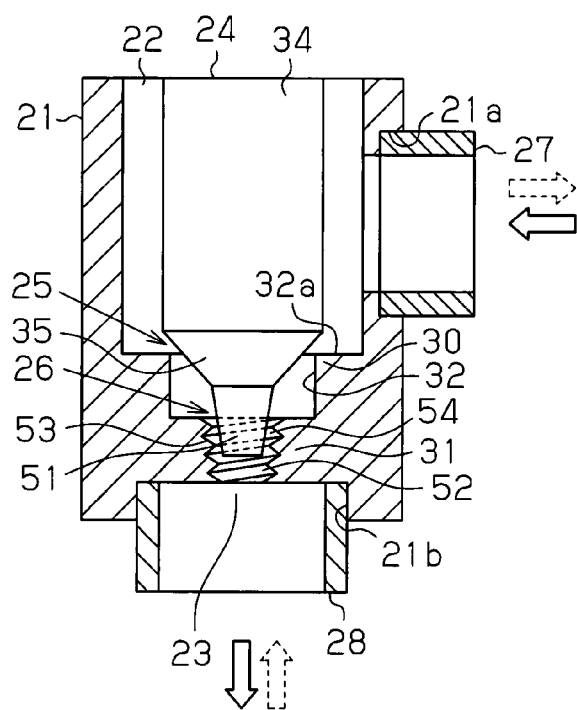
FIG. 7 is a partial cross-sectional view of an expansion valve according to a seventh embodiment of the present invention.

As shown in FIG. 7, a second valve portion 51 has an outer surface, which is smooth and tapered, and a second valve hole 52 has an inner surface, which includes a helical groove 53. In this case, a space between the helical groove 53 and the outer surface of a second valve portion 51 defines a helical passage 54. This structure has the same advantages as the second embodiment.

Eighth Embodiment

An expansion valve according to an eighth embodiment of the present invention will now be described with reference to FIG. 8. The components of the expansion valve of the eighth embodiment that are the same as the components in the first embodiment are given the same reference numerals as those components and will not be described in detail.

Figure 8:
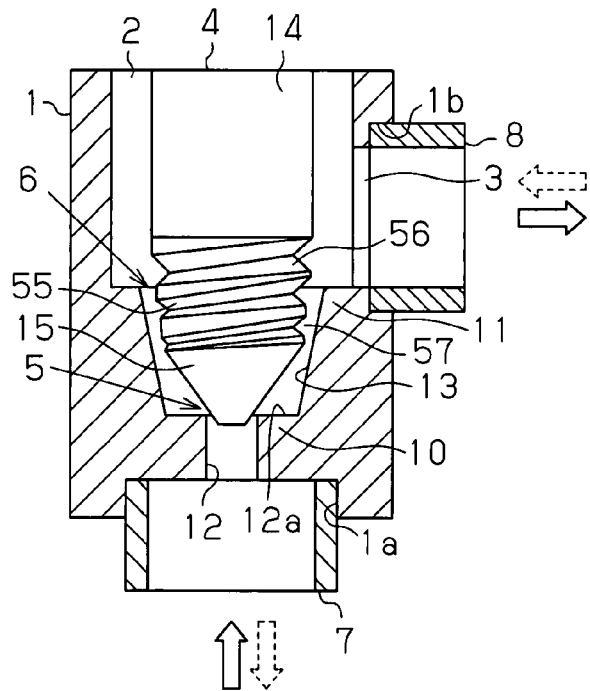
FIG. 8 is a partial cross-sectional view of an expansion valve according to an eighth embodiment of the present invention.

As shown in FIG. 8, a helical groove 55 is formed in a second valve portion 56. The helical groove 55 is formed by first forming an outer surface of the second valve portion 56 parallel to the center line of a valve member 4, threading the outer surface of the second valve portion 56, and then cutting the top of the thread of the helical groove 55 in a manner that the outer surface of the second valve portion 56 is tapered toward a distal end of the valve member 4. In this case, the outer surface of the second valve portion 56 is defined by the top of the thread and is tapered. A helical passage 57 is formed between the helical groove 55 and a second valve hole 13. The cross-sectional area of the helical passage 57 decreases toward the distal end of the valve member 4. With this structure, the cross-sectional area of the helical passage 57 decreases as the open degree of a second throttle 6 decreases. In this case, the length of the helical groove 55 and the cross-sectional area of the helical groove 55 adjust the open degree (throttling amount) of the second throttle 6.

Ninth Embodiment

An expansion valve according to a ninth embodiment of the present invention will now be described with reference to FIG. 9. The components of the expansion valve of the ninth embodiment that are the same as the components in the second embodiment are given the same reference numerals as those components and will not be described in detail.

Figure 9:
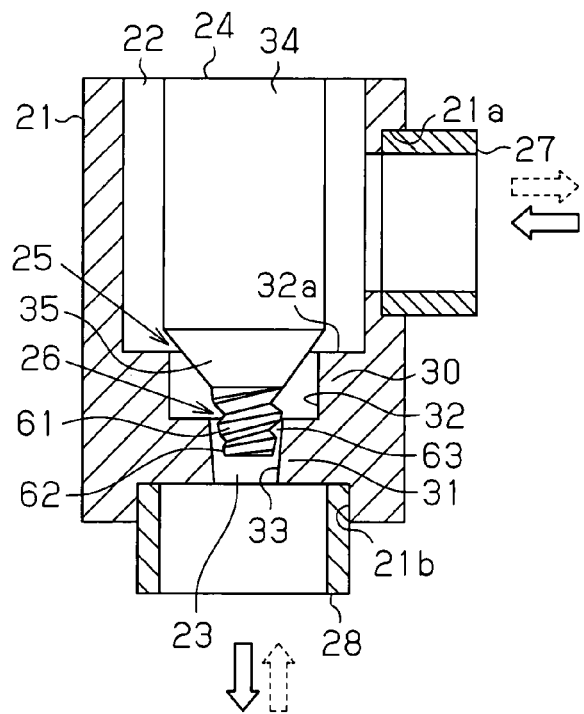
FIG. 9 is a partial cross-sectional view of an expansion valve according to a ninth embodiment of the present invention.

As shown in FIG. 9, a helical groove 61 is formed in a second valve portion 62. To form the helical groove 61, an outer surface of the second valve portion 62 is first formed parallel to a center line of a valve member 24. The outer surface of the second valve portion 62 is threaded, and then the top of the thread of the helical groove 61 is cut in a manner that the outer surface of the second valve portion 62 is tapered toward a distal end of the valve member 24. In this case, the top of the thread of the helical groove 61 forms the outer surface of the second valve portion 62 is defined and is a tapered surface. A helical passage 63 is formed between the helical groove 61 and the second valve hole 33. The cross-sectional area of the helical passage 63 decreases toward the distal end of the valve member 24. With this structure, the cross-sectional area of the helical passage 63 decreases as the open degree of a second throttle 26 decreases. In this case, the length of the helical groove 61 and the cross-sectional area of the helical groove 61 adjust the open degree (throttling amount) of the second throttle 26.

Tenth Embodiment

An expansion valve according to a tenth embodiment of the present invention will now be described with reference to FIG. 10. The components of the expansion valve of the tenth embodiment that are the same as the components in the first embodiment are given the same reference numerals as those components and will not be described in detail.

Figure 10:
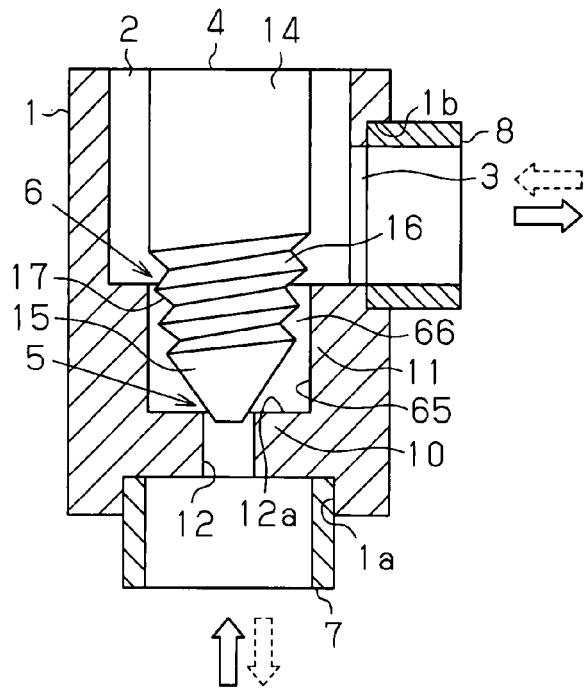
FIG. 10 is a partial cross-sectional view of an expansion valve according to a tenth embodiment of the present invention.

As shown in FIG. 10, an inner surface of a second valve hole 65 is parallel to a center line of a valve member 4. Further, a helical passage 66 is formed between an outer surface of a second valve portion 16 and an inner surface of the second valve hole 65. With this structure, when the open degree of a first throttle 5 decreases and the open degree of a second throttle 6 decreases, a gap formed between the outer surface of the second valve portion 16 and the inner surface of the second valve hole 65 decreases accordingly. In this state, foreign matter is easily trapped in the gap. However, when the open degree of the first throttle 5 is increases and the open degree of the second throttle 6 increases, the trapped foreign matter is easily washed off by the refrigerant flow.

Eleventh Embodiment

An expansion valve according to an eleven embodiment of the present invention will now be described with reference to FIG. 11. The components of the expansion valve of the eleventh embodiment that are the same as the components in the first embodiment are given the same reference numerals as those components and will not be described in detail.

Figure 11:
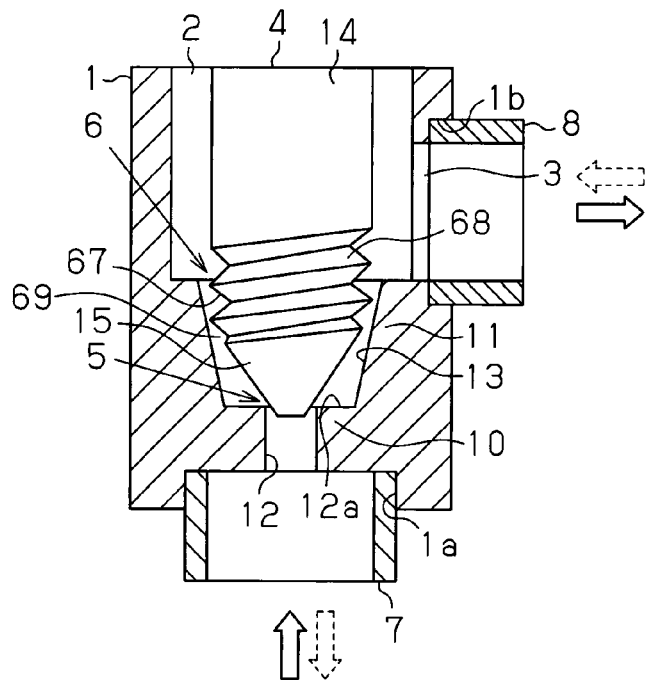
FIG. 11 is a partial cross-sectional view of an expansion valve according to an eleventh embodiment of the present invention.

As shown in FIG. 11, an outer surface of a second valve portion 68 is parallel to a center line of a valve member 4. Further, a helical groove 67 is formed on the outer surface of the second valve portion 68. The helical groove 67 is formed by extending the outer surface of the second valve portion 68 parallel to the center line of the valve member 4 and then threading the outer surface of the second valve portion 68. A helical passage 69 is formed between the helical groove 67 and the inner surface of a second valve hole 13. This structure changes the gap formed between the second valve portion 68 and the inner surface of the second valve hole 13 depending on the open degrees of first and second throttles 5 and 6. Thus, when the open degrees of the first and second throttles 5 and 6 are increased, the gap increases. In this state, foreign matter trapped in the gap is easily washed off by the refrigerant. This structure prevents clogging caused by foreign matter, and avoids problems such as defective operations of the valve member 4.

Twelfth Embodiment

An expansion valve according to a twelfth embodiment of the present invention will now be described with reference to FIGS. 12 and 13. The components of the expansion valve of the twelfth embodiment that are the same as the components in the first embodiment are given the same reference numerals as those components and will not be described in detail.

Figure 12:
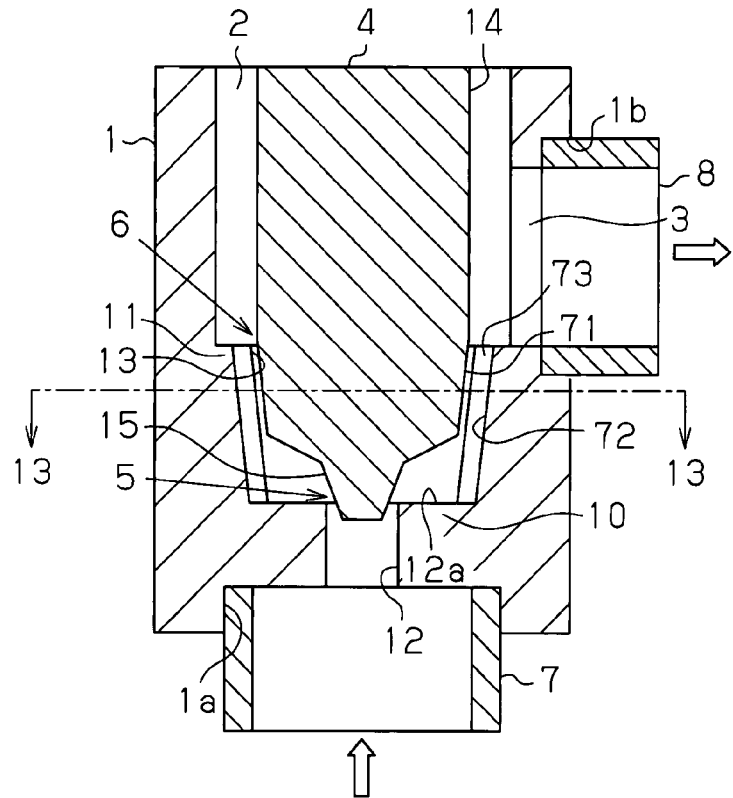
FIG. 12 is a partial cross-sectional view of an expansion valve according to a twelfth embodiment of the present invention.
Figure 13:
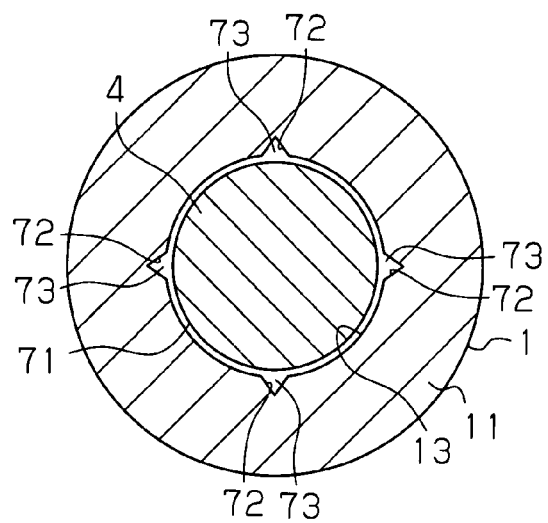
FIG. 13 is a cross-sectional view taken along line 13-13 in FIG. 12.

As shown in FIGS. 12 and 13, a second valve portion 71 is tapered from an intermediate portion of a valve member 4 toward a distal end of the valve member 4. Four linear grooves 72 are formed at regular intervals on an inner surface of a second valve hole 13. The linear grooves 72 extend along the axis of the valve member 4. Each linear groove 72 has the same shape, the same dimensions, and the same triangular cross-section. The inner diameter of the second valve hole 13 is set to enable the second valve portion 71 to slide in the second valve hole 13 when the throttling amount of a second throttle 6 is maximum. This forms a plurality of independent refrigerant flow passages, which form the second throttle 6, between the linear grooves 72 and the second valve portion 71. In this case, the sliding the valve member 4 in the axial direction changes the throttling amount of a first throttle 5 and also changes the length of overlapping portions (linear passages 73) of the linear grooves 72 and the second valve portion 71. The flow resistance of the refrigerant passing through the first throttle 5 and the flow resistance of the refrigerant passing through the second throttle 6 are changed at the same time.

The twelfth embodiment has the advantages described below.

(1) The structure including the first throttle 5 and the second throttle 6, which is arranged downstream from the first throttle 5, reduces the decompressing amount of the first throttle 5 when a slug flow or plug flow enters the inlet port 1a and reduces the ejection energy of the refrigerant ejected from the first throttle 5. Further, the refrigerant ejected from the first throttle 5 is dispersed in the plurality of linear passages 73, and the kinetic energy of the refrigerant is dispersed accordingly. The refrigerant that has passed through each linear passage 73 flows as a turbulent flow. This further reduces the velocity fluctuations and the pressure fluctuations of the refrigerant. Further, the refrigerant flowing from each linear passage 73 includes velocity fluctuations and pressure fluctuations unique to each linear passage 73. Thus, the plurality of refrigerant flows from these linear passages 73 collide with one another. This effectively reduces the velocity fluctuations and the pressure fluctuations of the refrigerant. Further, this structure effectively reduces the kinetic energy, the velocity fluctuations, and the pressure fluctuations of the refrigerant flow from the second throttle 6 to the pipe, and further reduces the noise generated by the refrigerant flow near the outlet of the expansion valve.

(2) The length of the overlapping portions of each linear groove 72 and the inner surface of the second valve hole 13 is changed by advancing and retracting the valve member 4. This enables the flow resistance of the refrigerant in the first throttle 5 and the flow resistance of the refrigerant in the second throttle 6 to be changed at the same time. Thus, the ratio of the refrigerant flow resistance of the first throttle 5 and the refrigerant flow resistance of the second throttle 6 is maintained in an optimum range. This structure stably reduces noise generated by the refrigerant flow near the outlet of the expansion valve.

(3) The outer surface of the second valve portion 71 and the inner surface of the second valve hole 13 are tapered toward the distal end of the valve member 4. In this case, foreign matter is not easily trapped in the gap formed between the outer surface of the second valve portion 71 and the inner surface of the second valve hole 13. This structure avoids problems such as defective operations of the valve member 4.

(4) The outer surface of the second valve portion 71 and the inner surface of the second valve hole 13 are parallel to each other. Thus, the linear passages 73 effectively reduce the velocity fluctuations and the pressure fluctuations of the refrigerant irrespective of the open degree of the second throttle 6.

(5) The linear grooves 72 are formed at regular intervals. Thus, the refrigerant is uniformly dispersed in the linear passages 73. This structure further effectively disperses the kinetic energy of the refrigerant flow.

(6) The distal end portion of the valve member 4 defines the first valve portion 15, and the intermediate portion of the valve member 4 defines the second valve portion 71. In this case, the outer diameter of the second valve portion 71 and the inner diameter of the second valve hole 13 are large. This alleviates design limitations on the length or width, or depth of the linear grooves 72. Further, this facilitates the designing of the expansion valve for reducing the velocity fluctuations and the pressure fluctuations of the refrigerant passing through the second throttle 6.

(7) Without the need to use extremely narrow passages as the throttle as in the conventional method A, the throttle is prevented from being clogged with foreign matter. Further, the first throttle 5 can be fully closed. This enables the first throttle 5 to have a sufficiently large throttling amount required to fully close the first throttle 5.

(8) The refrigerant flow passage 3 is partitioned by the first and second partition walls 10 and 11. The single valve member 4 is driven to adjust the open degrees of the first and second valve holes 12 and 13 of the first and second partition walls 10 and 11. The first throttle 5 is formed between the first valve hole 12 and the first valve portion 15. The second throttle 6 is formed between the second valve hole 13 and the second valve portion 71. This simplifies the structure of the expansion valve including the two-step throttle.

Thirteenth Embodiment

An expansion valve according to a thirteenth embodiment of the present invention will now be described with reference to FIGS. 14 and 15. The components of the expansion valve of the thirteenth embodiment that are the same as the components in the second embodiment are given the same reference numerals as those components and will not be described in detail.

Figure 14:
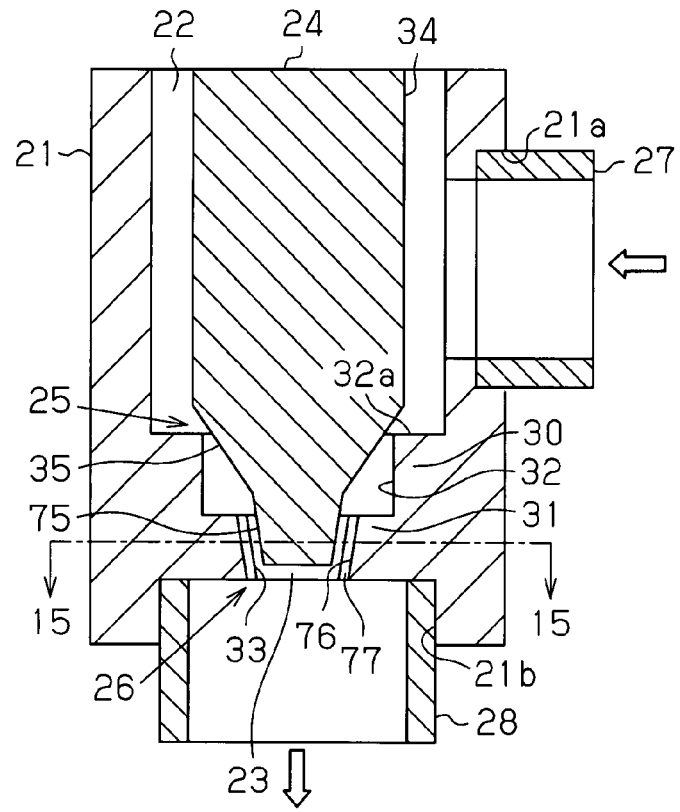
FIG. 14 is a partial cross-sectional view of an expansion valve according to a thirteenth embodiment of the present invention.
Figure 15:
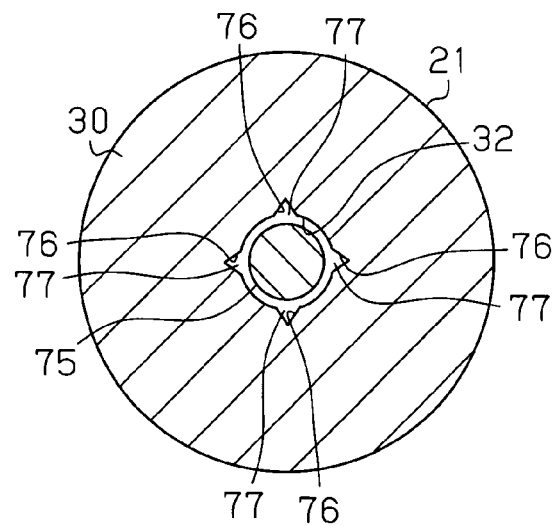
FIG. 15 is a cross-sectional view taken along line 15-15 in FIG. 14.

As shown in FIGS. 14 and 15, a second valve portion 75 is tapered toward a distal end of a valve member 24. Four linear grooves 76 are formed at regular intervals in an inner surface of a second valve hole 33. The linear grooves 76 extend along the axis of the valve member 24. Each linear groove 76 has the same shape, the same dimensions, and substantially the same triangular cross-section. The inner diameter of the second valve hole 33 is set to enable the second valve portion 75 to slide in the second valve hole 33 when the throttling amount of a second throttle 26 is maximum. This forms a plurality of independent refrigerant flow passages, which form the second throttle 26, between the linear grooves 76 and the second valve portion 75. In this case, the sliding the valve member 24 in the axial direction changes the throttling amount of a first throttle 25 and also changes the length of overlapping portions (linear passages 77) of the linear grooves 76 and the second valve portion 75. The flow resistance of the refrigerant passing through the first throttle 25 and the flow resistance of the refrigerant passing through the second throttle 26 are changed at the same time.

The thirteenth embodiment has the advantages described below.

(1) The structure including the first throttle 25 and the second throttle 26, which is arranged downstream from the first throttle 25, reduces the decompressing amount of the first throttle 25 when a slug flow or plug flow enters the inlet port 21a and reduces flow ejection energy of the refrigerant ejected from the first throttle 25. Further, the refrigerant ejected from the first throttle 25 is dispersed in the plurality of linear passages 77, and the kinetic energy of the refrigerant is dispersed accordingly. The refrigerant that has passed through each linear passage 77 generates a turbulent flow. This further reduces the velocity fluctuations and the pressure fluctuations of the refrigerant. Further, the refrigerant flowing from each linear passage 77 has velocity fluctuations and pressure fluctuations unique to each linear passage 77. Thus, the plurality of refrigerant flows from these linear passages 77 collide with one another. This effectively reduces the velocity fluctuations and the pressure fluctuations of the refrigerant. Further, this structure further reduces the kinetic energy, the velocity fluctuations, and the pressure fluctuations of the refrigerant flow from the second throttle 26 to a pipe, and further reduces noise generated by the refrigerant flow near the outlet of the expansion valve.

(2) The structure enables the flow resistance of the refrigerant in the first throttle 25 and the flow resistance of the refrigerant in the second throttle 26 to be changed at the same time. This stably reduces noise generated by the refrigerant flow near the outlet of the expansion valve.

(3) The outer surface of the second valve portion 75 and the inner surface of the second valve hole 33 are tapered toward the distal end of the valve member 24. In this case, foreign matter is not easily trapped in the gap formed between the outer surface of the second valve portion 75 and the inner surface of the second valve hole 33. This structure avoids problems such as defective operations of the valve member 24.

(4) The outer surface of the second valve portion 75 and the inner surface of the second valve hole 33 are parallel to each other. Thus, the linear passages 77 effectively reduce the velocity fluctuations and the pressure fluctuations of the refrigerant irrespective of the open degree of the second throttle 26.

(5) The linear grooves 76 are formed at regular intervals. Thus, the refrigerant is uniformly dispersed in the linear passages 77. This structure further effectively disperses the kinetic energy of the refrigerant flow.

(6) Without the need to use extremely narrow passages as the throttle as in the conventional method A, the throttle is prevented from being clogged with foreign matter. Further, the first throttle 25 can be fully closed. This enables the first throttle 25 to have a sufficiently large throttling amount required to fully close the first throttle 25.

(7) The refrigerant flow passage 23 is partitioned by the first and second partition walls 30 and 31. The single valve member 24 is driven to adjust the open degrees of the first and second valve holes 31 and 33 of the first and second partition walls 30 and 31. The second throttle 26 is formed between the first valve hole 32 and the first valve portion 35. This simplifies the structure of the expansion valve including the two-step throttle.

Fourteenth Embodiment

An expansion valve according to a fourteenth embodiment of the present invention will now be described with reference to FIGS. 16 and 17. The components of the expansion valve of the fourteenth embodiment that are the same as the components in the twelfth embodiment are given the same reference numerals as those components and will not be described in detail.

Figure 16:
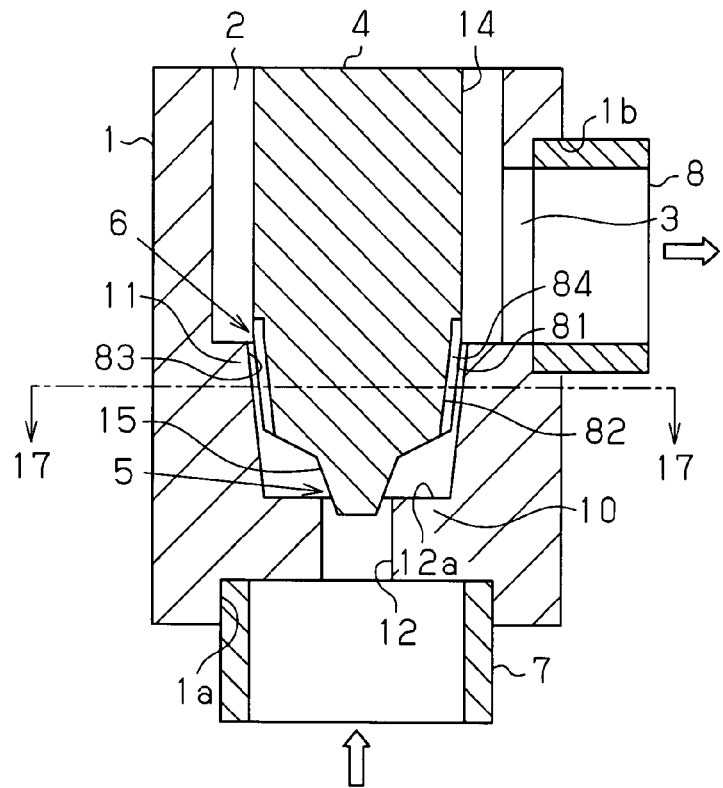
FIG. 16 is a partial cross-sectional view of an expansion valve according to a fourteenth embodiment of the present invention.
Figure 17:
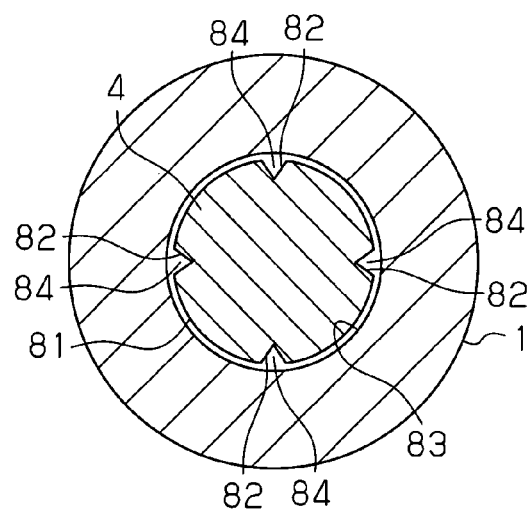
FIG. 17 is a cross-sectional view taken along line 17-17 in FIG. 16.

As shown in FIGS. 16 and 17, four linear grooves 82 are formed on an outer surface of a second valve portion 81 at regular intervals. An inner surface of a second valve hole 83 is formed as a smooth tapered surface that is free from grooves. Four independent linear passages 84 are formed between the linear grooves 82 and the inner surface of the second valve hole 83. With this structure, the linear grooves 82 are machined more easily than in the twelfth embodiment.

Fifteenth Embodiment

An expansion valve according to a fifteenth embodiment of the present invention will now be described with reference to FIG. 18. The components of the expansion valve of the fifteenth embodiment that are the same as the components in the thirteenth embodiment are given the same reference numerals as those components and will not be described in detail.

Figure 18:
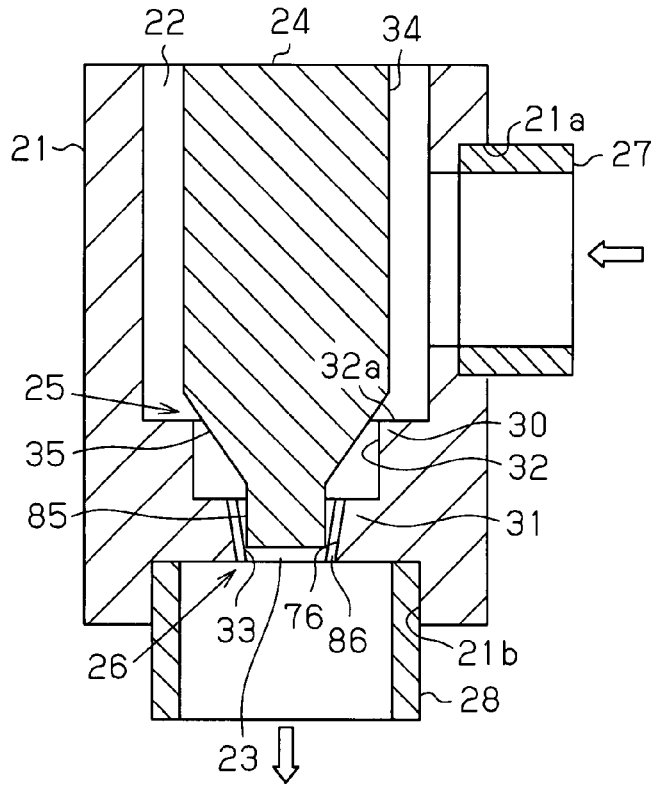
FIG. 18 is a partial cross-sectional view of an expansion valve according to a fifteenth embodiment of the present invention.

As shown in FIG. 18, an outer surface of a second valve portion 85 is parallel to a central axis of a valve member 24. A second valve hole 33 is tapered toward a distal end of the valve member 24. A plurality of linear grooves 76 are formed on an inner surface of the second valve hole 33. A plurality of independent linear passages 86 are formed between the outer surface of the second valve portion 85 and the inner surface of the second valve hole 33. In this case, a second throttle 26 closes and opens by advancing and retracting the valve member 24 to increase or decrease a gap formed between an outer surface of the second valve portion 85 and an inner surface of the second valve hole 33. Thus, when the open degree of the second throttle 26 is increased, foreign matter trapped in the gap formed between the outer surface of the second valve portion 85 and the inner surface of the second valve hole 33 is washed off easily by the refrigerant flow.

Sixteenth Embodiment

An expansion valve according to a sixteenth embodiment of the present invention will now be described with reference to FIG. 19. The components of the expansion valve of the sixteenth embodiment that are the same as the components in the twelfth embodiment are given the same reference numerals as those components and will not be described in detail.

Figure 19:
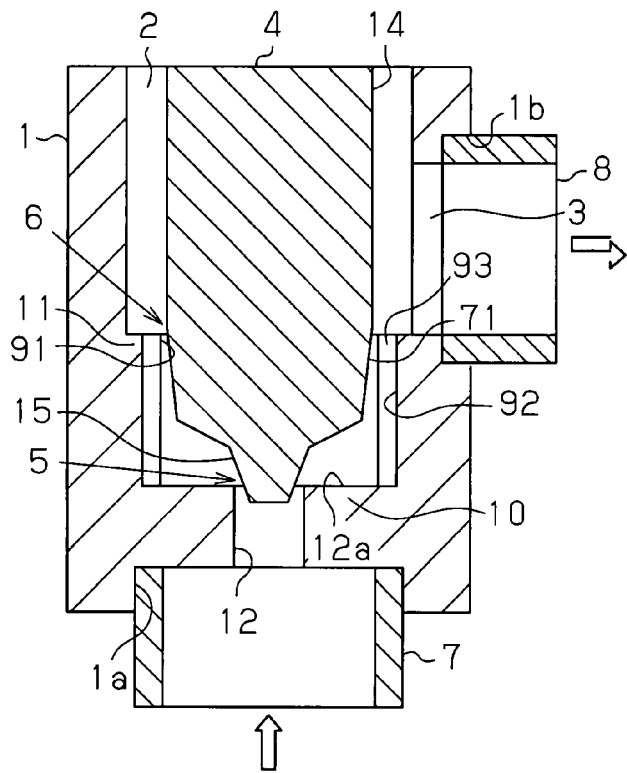
FIG. 19 is a partial cross-sectional view of an expansion valve according to a sixteenth embodiment of the present invention.

As shown in FIG. 19, an inner surface of a second valve hole 91 is parallel to a central axis of a valve member 4. A plurality of linear grooves 92, each having a triangular cross-section, are formed in an inner surface of the second valve hole 91. A plurality of independent linear passages 93 are formed between an outer surface of a second valve portion 71 and an inner surface of the second valve hole 91. In this case, a second throttle 6 closes and opens by advancing and retracting the valve member 4 to increase or decrease a gap formed between the outer surface of the second valve portion 71 and the inner surface of the second valve hole 91. Thus, when the open degree of the second throttle 6 is increased, foreign matter trapped in the gap is washed off easily by the refrigerant flow.

Seventeenth Embodiment

An expansion valve according to a seventeenth embodiment of the present invention will now be described with reference to FIGS. 20 to 22. The components of the expansion valve of the seventeenth embodiment that are the same as the components in the third embodiment are given the same reference numerals as those components and will not be described in detail.

Figure 20:
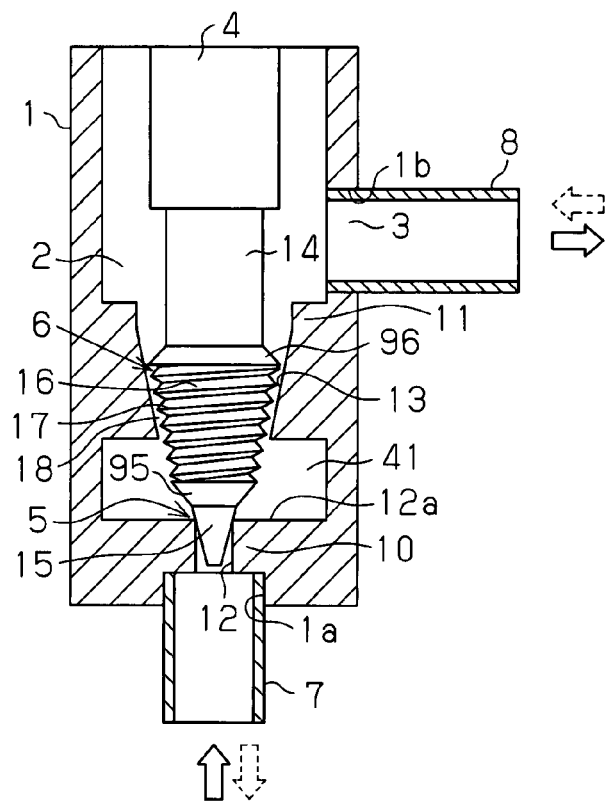
FIG. 20 is a partial cross-sectional view of an expansion valve according to a seventeenth embodiment of the present invention in a state in which the open degree is minimum.
Figure 21:
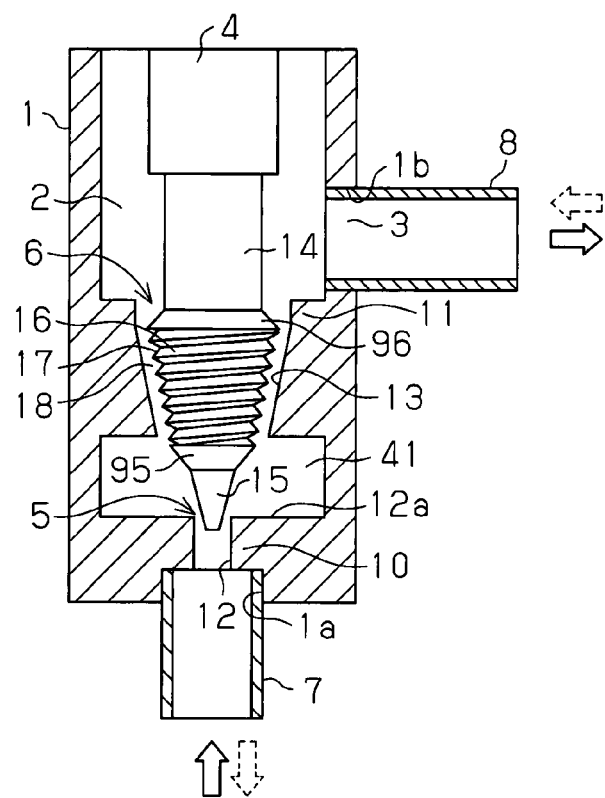
FIG. 21 is a partial cross-sectional view of the expansion valve according to the seventeenth embodiment in a state in which the open degree is maximum.
Figure 22:
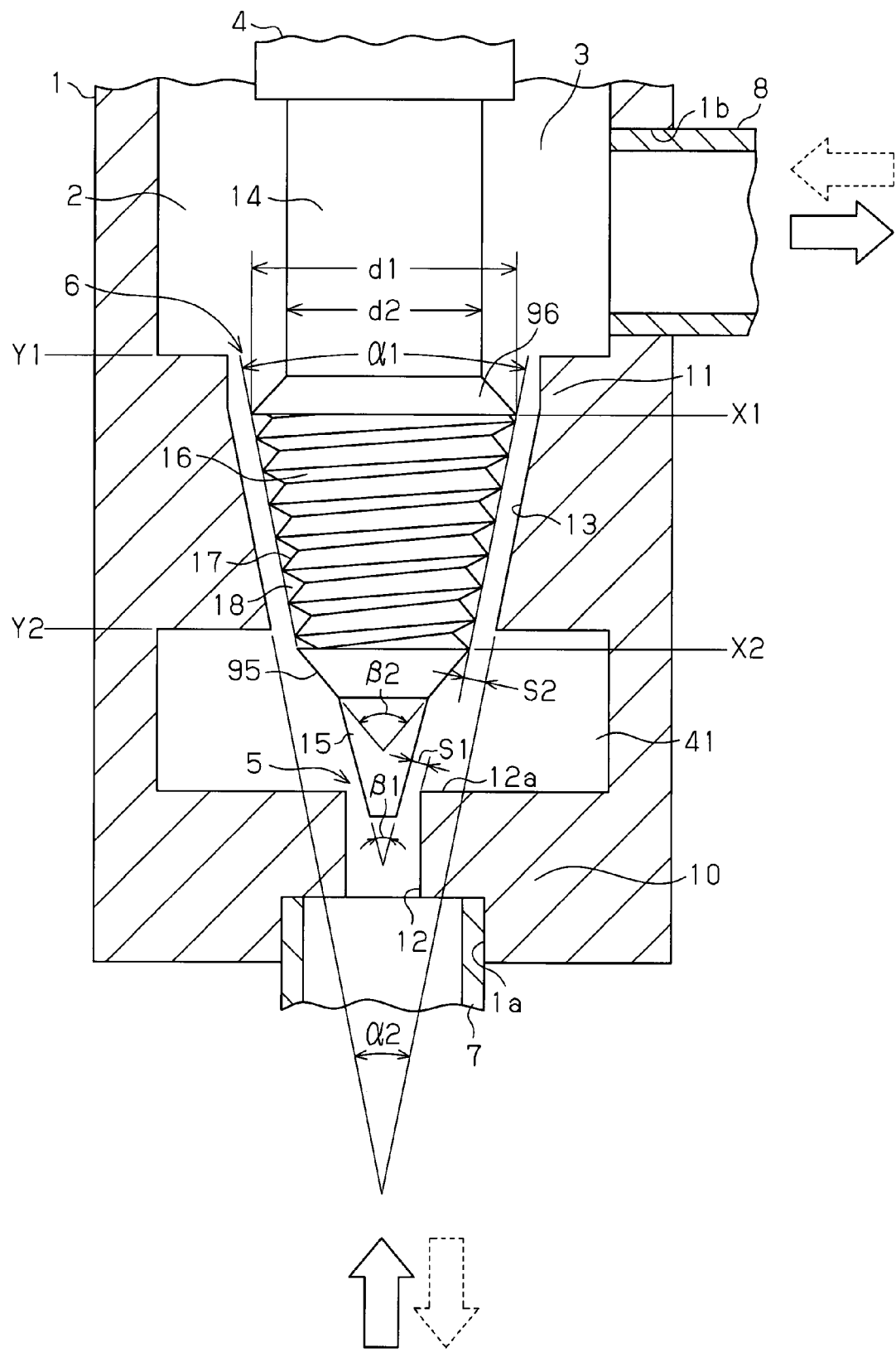
FIG. 22 is an enlarged partial cross-sectional view of the expansion valve according to the seventeenth embodiment.
Figure 23:
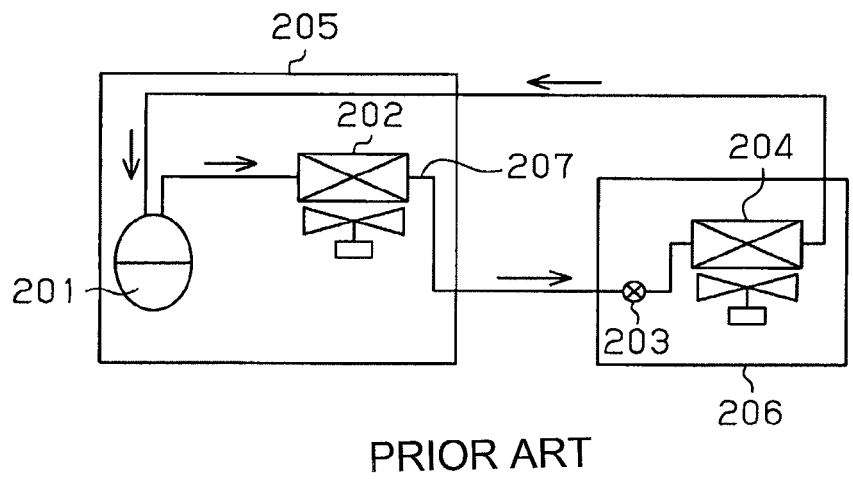
FIG. 23 is a block diagram showing a refrigerant circuit of a conventional separate-type air conditioner.
Figure 24:
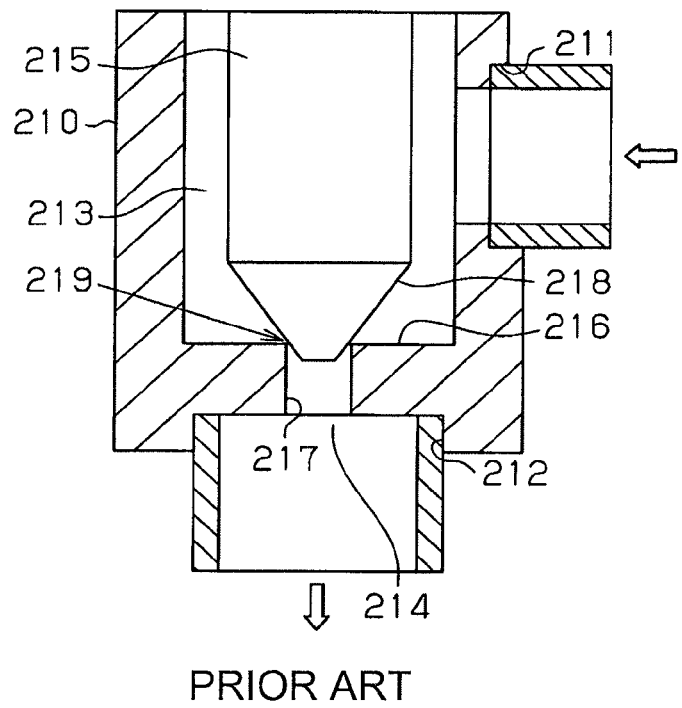
FIG. 24 is a partial cross-sectional view schematically showing an expansion valve including a refrigeration circuit.

As shown in FIGS. 20 to 22, a tapering angle $\alpha 1$ of a second valve portion 16 and a tapering angle $\alpha 2$ of a second valve hole 13 are the same. In this case, the tapering angle $\alpha 2$ of the second valve hole 13 is preferably about 5 to 60 degrees. The lower limit of 5 degrees is the smallest value of the tapering angle α2 that enables foreign matter trapped in a gap formed between the thread of a helical groove 17 and an inner surface of the second valve hole 13 to be removed. The upper limit of 60 degrees is the largest value of the tapering angle α1 determined based on the length necessary to form the helical groove 17. In the present embodiment, the tapering angle α1 and the tapering angle α2 are each about 25 degrees.

A downstream end portion of the second valve portion 16 is arranged in the second valve hole 13 within the range from a minimum value of the open degree of a second throttle 6 (state shown in FIG. 20) to a maximum value of the open degree of the second throttle 6 (state shown in FIG. 21). More specifically, position X1 of the downstream end portion of the second valve portion 16 is constantly below position Y1 of a downstream end portion of the second valve hole 13 irrespective of the open degree of the second throttle 6.

Further, the downstream end portion of the second valve portion 16 is connected to a connecting portion 14 by a second varying diameter joint portion 96. The diameter d2 of the connecting portion 14 is smaller than the diameter d1 of the largest circumferential part of the second valve portion 16. The largest circumferential part of the second valve portion 16 is continuously connected to the connecting portion 14 by the second varying diameter joint portion 96. The second varying diameter joint portion 96 is taper from the second valve portion 16 toward the connecting portion 14.

An upstream end portion of the second valve portion 16 is arranged in an enlarged space portion 41 within the range from a minimum value of the open degree of the second throttle 6 (state shown in FIG. 20) to a maximum value of the open degree of the second throttle 6 (state shown in FIG. 21). More specifically, position X2 of the upstream end portion of the second valve portion 16 is constantly below position Y2 of an upstream end portion of the second valve hole 13 within the range from the minimum value to the maximum value of the open degree of the second throttle 6.

A first valve portion 15 is tapered toward a distal end of a valve member 4. A tapering angle β1 of the first valve portion 15 is greater than a tapering angle α2 of the second valve hole 13. Further, a first varying diameter joint portion 95 is arranged between the second valve portion 16 and the first valve portion 15. The first varying diameter joint portion 95 is formed to taper from the second valve portion 16 toward the first valve portion 15. A tapering angle β2 of the first varying diameter joint portion 95 is greater than the tapering angle β1 of the first valve portion 15.

A gap S1 formed between the first valve portion 15 and a first valve hole 12 is smaller than the minimum gap S2 between the second valve portion 16 and the second valve hole 13. The gap S1 between the first valve portion 15 and the first valve hole 12 is the shortest distance between the first valve portion 15 and an outlet side edge of the first valve hole 12. Further, a minimum gap S2 formed between the second valve portion 16 and the second valve hole 13 is the shortest distance between the second valve portion 16 and the second valve hole 13. The tapering angle α1 of the second valve portion 16 is the same as the tapering angle α2 of the second valve hole 13.

The seventeenth embodiment has the advantages described below.

(1) If the downstream end portion of the second valve portion 16 protrudes downstream from the second valve hole 13, the refrigerant flow rectified in the second throttle 6 would generate a strong swirling vortex. In the present embodiment, the downstream end portion of the second valve portion 16 does not protrude downstream from the second valve hole 13. This structure prevents the refrigerant from flowing as a turbulent flow as described above and further effectively reduces noise generated by the refrigerant flow.

(2) The upstream end portion of the second valve portion 16 is arranged in the enlarged space portion 41 within the range from the minimum value to the maximum value of the open degree of the second throttle 6. In this case, refrigerant flows smoothly from the enlarged space portion 41 to the second throttle 6. This structure further reduces noise generated by the refrigerant flow.

(3) The tapering angle α1 of the second valve portion 16 and the tapering angle α2 of the second valve hole 13 are the same. This enables the helical passage 18 forming the second throttle 6 to function effectively for the refrigerant irrespective of the open degree of the second throttle 6.

(4) The tapering angle β1 of the first valve portion 15 is greater than the tapering angle α2 of the second valve hole 13. In this case, the first throttle 5 changes its throttling amount more than the second throttle 6 when the valve member 4 advances and retracts.

(5) The tapering angle α2 of the second valve hole 13 is preferably in the range of about 5 to 60 degrees. In this case, foreign matter trapped in the gap formed between the thread of the helical groove 17 and the inner surface of the second valve hole 13 is easily removed. This structure further enables the helical groove 17 to have a sufficient length.

(6) The gap S1 formed between the first valve portion 15 and the first valve hole 12 is smaller than the minimum gap S2 formed between the outer surface of the second valve portion 16 and the second valve hole 13. In this case, the first throttle 5 changes its throttling amount more than the second throttle 6. This structure further prevents the second throttle 6 from being clogged with foreign matter. Thus, for example, the first throttle 5 may be used as a main throttle and the second throttle 6 may be used as a noise reducing unit. In this way, the first throttle 5 and the second throttle 6 may be used to realize different functions. This enables the expansion valve to be designed in an optimum manner.

(7) The diameter d2 of the connecting portion 14 is smaller than the diameter d1 of the largest outer part of the second valve portion 16. This lowers the velocity of the refrigerant flowing from the second throttle 6 to the pipe and prevents the refrigerant flow from being disturbed in an unnecessary manner at the vicinity of the outlet port 1b. Additionally, noise generated by the refrigerant flow is further reduced.

(8) The second varying diameter joint portion 96 is formed between the connecting portion 14 and the second valve portion 16. This structure prevents refrigerant flows from being disturbed in the valve body 1 and further reduces noise generated by the refrigerant flow.

(9) The first varying diameter joint portion 95 is formed between the upstream end portion of the second valve portion 16 and the downstream end portion of the first valve portion 15. Further, the tapering angle β2 of the first varying diameter joint portion 95 is larger than the tapering angle β1 of the first valve portion 15. In this case, the dimensions of the first and second valve holes 12 and 13 are easily optimized.

The present invention may be modified in the following forms.

In the first embodiment, the outlet port 1b may be formed in the lower portion of the valve body 1 and the inlet port 1a may be formed in the side wall of the valve body 1 so that refrigerant flows in a direction indicated by an arrow drawn with a broken line in FIG. 1.

In the second embodiment, the inlet port 21a may be formed in the lower portion of the valve body 21 and the outlet port 21b may be formed in the side wall of the valve body 21 so that refrigerant flows in a direction indicated by an arrow drawn with a broken line in FIG. 2.

In the sixth embodiment, the outlet port 1b may be formed in the lower portion of the valve body 1 and the inlet port 1a may be formed in the side wall of the valve body 1 so that refrigerant flows in a direction indicated by an arrow drawn with a broken line in FIG. 6.

In the seventh embodiment, the inlet port 21a may be formed in the lower portion of the valve body 1 and the outlet port 21b may be formed in the side wall of the valve body 1 so that refrigerant flows in a direction indicated by an arrow drawn with a broken line in FIG. 7.

In each of these cases, the second throttle is formed by the helical passage having a sufficient length. Thus, this structure reduces the pressure fluctuations of the two-phase flow of gaseous and liquid phases. Further, bubbles in the refrigerant are broken up while the refrigerant is swirling along the helical groove. The bubbles are sufficiently broken up even when the refrigeration load is low and the velocity of the refrigerant flow is low, that is, when the open degree of the second throttle is small and the gap formed between the helical groove and the inner surface of the second valve hole is small. The bubbles are also sufficiently broken up when the refrigeration load is high and the velocity of the refrigerant flow is high, that is, when the open degree of the second throttle is large and the gap formed between the helical groove and the inner surface of the second valve hole is large. Accordingly, the effect for effectively breaking up bubbles and effectively reducing the pressure fluctuations of the two-phase flow of gaseous and liquid phases enable the refrigerant flow to be rectified to flow continuously from the second throttle to the first throttle when a slug flow or plug flow enters the inlet port.

The refrigerant flows linearly from the second throttle to the first throttle. This reduces the throttling amount of the first throttle and reduces the kinetic energy of the refrigerant passing through the first throttle. Thus, the pressure fluctuations of the refrigerant in the first throttle are reduced.

The first throttle can be fully closed. This enables the first throttle to have a sufficiently large throttling amount required to fully close the first throttle. In this case, foreign matter is less likely to clog the throttle as compared with the conventional method A.

The outer surface of the second valve portion and the inner surface of the second valve hole are tapered toward the distal end of the valve member. This minimizes changes in the gap formed between the helical groove and the inner surface of the second valve hole when the open degree of the second throttle is set large. Thus, the shape of the helical passages is easily maintained irrespective of the open degree of the second throttle. This enables the helical passage to further effectively break up bubbles formed in the refrigerant.

The outer surface of the second valve portion and the inner surface of the second valve hole are tapered at the same angle. Thus, the shape of the helical passage is more easily maintained irrespective of the open degree of the second throttle. The helical passage effectively breaks up bubbles formed in the refrigerant in a stable manner.

The helical groove is formed on the outer surface of the second valve portion. Thus, the helical groove is easily machined.

The distal end portion of the valve member is formed as the first valve portion and the intermediate portion of the valve member is formed as the second valve portion. The helical groove is formed on the outer surface of the second valve portion. In this case, the outer diameter of the second valve portion may be increased so that the helical passage has a sufficient length.

In the third embodiment, the outlet port 1b may be formed in the lower portion of the valve body 1, the inlet port 1a may be formed in the side wall of the valve body 1, and the refrigerant may flow in an arrow direction shown in a broken line in FIG. 3. In this case, the refrigerant flow that has passed through the second throttle 6 is disturbed in the enlarged space portion 41. This further breaks up bubbles in the refrigerant. This structure further effectively reduces noise generated by the refrigerant flow.

In the fifth embodiment, the outlet port 1b may be formed in the lower portion of the valve body 1 and the inlet port 1a may be formed in the side wall of the valve body 1 so that refrigerant flows in an arrow direction indicated by a broken line in FIG. 5. In this case, a swirling vortex is generated by the refrigerant flowing from the second throttle 6 to the first valve hole 12 in a swirling space portion 44. This further breaks up the bubbles in the refrigerant and further reduces noise generated by the refrigerant flow.

In the eighth embodiment, the outlet port 1b may be formed in the lower portion of the valve body 1 and the inlet port 1a may be formed in the side wall of the valve body 1 so that refrigerant flows in a direction indicated by an arrow drawn with a broken line in FIG. 8.

In the ninth embodiment, the inlet port 21a may be formed in the lower portion of the valve body 1 and the outlet port 21b may be formed in the side wall of the valve body 1 so that refrigerant flows in a direction indicated by an arrow drawn with a broken line in FIG. 9.

In each of these cases, when the open degree of the second throttle is decreased, the cross-sectional area of the helical passage decreases accordingly. In this case, the length and the cross-sectional area of the helical groove adjust the open degree of the second throttle. This structure increases the throttling amount with respect to the advancement and retraction amount of the valve member.

In the tenth embodiment, the outlet port 1b may be formed in the lower portion of the valve body 1 and the inlet port 1a may be formed in the side wall of the valve body 1 so that refrigerant flows in a direction indicated by an arrow drawn with a broken line in FIG. 10.

In the eleventh embodiment, the outlet port 1b may be formed in the lower portion of the valve body 1 and the inlet port 1a may be formed in the side wall of the valve body 1 so that refrigerant flows in a direction indicated by an arrow drawn with a broken line in FIG. 11.

In each of these cases, when the open degree of the first throttle 5 is decreased, the gap formed between the second valve portion 16 and the second valve hole 13 decreases. Thus, foreign matter is easily trapped in the gap. However, when the open degree of the first throttle 5 is increased, the gap increases. In this state, the foreign matter trapped in the gap is easily washed off by the refrigerant. This structure prevents clogging caused by foreign matter and avoids problems including defective operations of the valve member 4.

In the seventeenth embodiment, the outlet port 1b may be formed in the lower portion of the valve body 1 and the inlet port 1a may be formed in the side wall of the valve body 1 so that refrigerant flows in a direction indicated by an arrow drawn with a broken line in each of FIGS. 20 to 22.

In this case, the upstream end portion of the second valve portion 16 is arranged in the second valve hole 13 within the range from the minimum value to the maximum value of the open degree of the second throttle 6. This structure prevents the refrigerant flow from being disturbed by the second valve portion 16 before the helical passage 18 breaks up bubbles in the refrigerant.

The downstream end portion of the second valve portion 16 is arranged in the enlarged space portion 41 within the range from the minimum value to the maximum value of the open degree of the second throttle 6. This structure enables the refrigerant to flow continuously from the helical passages 18 to the enlarged space portion 41. Then, the two-phase flow of gaseous and liquid phases flows as a turbulent flow in the enlarged space portion 41, where bubbles in the refrigerant are broken up. This structure further reduces noise generated by the refrigerant flow.

The outer surface of the second valve portion 16 and the inner surface of the second valve hole 13 are both tapered toward the distal end of the valve member 4.

Further, these surfaces are tapered at the same angle. In this case, the open degree of the second valve portion 16 does not cause the helical passage 18 to change greatly. Thus, this structure stably breaks up bubbles in the refrigerant.

The gap S1 formed between the first valve portion 15 and the first valve hole 12 is smaller than the minimum gap S2 formed between the second valve portion 16 and the second valve hole 13 irrespective of the open degree of the first throttle 5 and the second throttle 6. In this case, the first throttle 5 changes its throttling amount more than the second throttle 6. This structure prevents the second throttle 6 from being clogged with foreign matter.

The diameter d2 of the connecting portion 14 is smaller than the diameter d1 of the largest outer part of the second valve portion 16. In that case, the refrigerant flowing in the valve body 1 is not hindered by the connecting portion 14. This further reduces noise generated by the refrigerant flow.

In each of the above embodiments, the expansion valve may be used in a multi-type air conditioner that connects a plurality of indoor units to a single outdoor unit. In a multi-type air conditioner, relatively large bubbles often enter an inlet of an expansion valve. Thus, when the expansion valve of the present invention is used in such a multi-type air conditioner, the expansion valve effectively reduces noise generated by the refrigerant flow.

In the above embodiments, the first throttles 5 and 25 may be used in the range in which the first throttles 5 and 25 are not fully closed. Further, the first throttles 5 and 25 may be formed so that they do not fully close.

In the second and sixth to sixteenth embodiments, the enlarged space portion 41 described in the third embodiment may be formed. These structures reduce the velocity fluctuations and the pressure fluctuations of the refrigerant and further reduce noise generated by the refrigerant flow near the outlet of the expansion valve.

In the sixth, eighth, tenth to twelfth, fourteenth, and sixteenth embodiments, the enlarged space portion 41 described in the third embodiment may be formed and the guide portion described in the fourth embodiment may be formed on the first valve portion 15. These structures enhance generation of a vortex in the enlarged space portion 41 and further reduce noise generated by the refrigerant flow near the outlet of the expansion valve.

In the fourth, sixth, eighth, tenth to twelfth, fourteenth, sixteenth, and seventeenth embodiments, the valve seat 43 described in the fifth embodiment may be formed and the vortex generation space 44 for swirling the refrigerant may be formed. These structures enhance generation of a vortex in the vortex generation space 44 and further reduce noise generated by the refrigerant flow near the outlet of the expansion valve.

In the second to ninth and eleventh embodiments, the inner surfaces of the second valve holes 13, 33, 47, and 52 may be formed parallel to the central axes of the valve members 4 and 24 as in the tenth embodiment.

In the same manner, in the twelfth to fifteenth embodiments, the inner surfaces of the second valve holes 13, 33, and 83 may be formed parallel to the central axes of the valve members 4 and 24 as in the sixteenth embodiment.

In the second to fifth, eighth, and ninth embodiments, the surfaces formed by the threads of the helical grooves 17, 37, 55, and 61 may be formed parallel to the central axes of the valve members 4 and 24 as in the eleventh embodiment.

In the sixth and seventh embodiments, the inner surfaces of the second valve holes 47 and 52 may be formed parallel to the center line of the valve member 24, and the helical grooves 48 and 53 may be formed in the inner surfaces of the second valve holes 47 and 52.

In the third to fifth and tenth embodiments, the outer surface of the second valve portion 16 may be formed parallel to the center line of the valve member 4, the helical groove 17 may be formed by threading the outer surface of the second valve portion 16, and the outer surface of the second valve portion 16 may be tapered toward the distal end of the valve member 4 by cutting the top of the thread of the helical groove 17 as in the eighth embodiment. In each of these cases, the length and the cross-sectional area of the helical groove 17 adjusts the open degree of the second throttle 6.

In the sixth and seventh embodiments, the inner surfaces of the second valve holes 47 and 52 may be formed parallel to the center line of the valve member 24 and the helical grooves 48 and 53 may be formed in the inner surfaces of the second valve holes 47 and 52. Then, the top of the threads of the helical grooves 48 and 53 may be cut. In these cases, the length and the cross-sectional areas of the helical grooves 48 and 53 adjust the open degree of the second throttles 6 and 26.

In the first to eleventh and seventeenth embodiments, each of the helical grooves 17, 37, 48, 53, 55, 61, 67 of the second throttles 6 and 26 may be formed by a plurality of helical grooves arranged in parallel to one another. In each of these cases, the refrigerant flows from the plurality of helical grooves forming the helical passages 18, 38, 49, 54, 57, 63, 66, and 69 collide with one another. These structures further reduce the velocity fluctuations and the pressure fluctuations of the refrigerant.

In the twelfth to sixteenth embodiments, the cross-sectional shapes of the linear grooves 72, 76, 82, and 92 may have any shapes including round, elongated, or rectangular shapes. Further, the cross-sectional areas of the linear grooves 72, 76, 82, and 92 may be varied in the advancement and retraction direction of the valve members 4 and 24 to vary the cross-sectional areas of the linear passages 73, 77, 84, 86, and 93. Further, the number of the linear grooves 72, 76, 82, and 92 may be changed to vary the total cross-sectional areas of the linear grooves 72, 76, 82, and 92.

In the thirteenth, fifteenth, and sixteenth embodiments, a plurality of independent linear grooves may be formed in the second valve portions 75, 85, and 71 as in the fourteenth embodiment.

In the thirteenth embodiment, the inner surface of the second valve hole 33 may be formed parallel to the central axis of the valve member 24 as in the sixteenth embodiment. In the twelfth embodiment, the outer surface of the second valve portion 71 may be formed parallel to the central axis of the valve member 4 as in the fifteenth embodiment.

In the first to ninth and seventeenth embodiments, the tapering angles of the second valve portions 16, 36, 46, 51, 56, and 62 may differ from the tapering angles of the inner surfaces of the second valve holes 13, 33, 47, and 52.

In the twelfth to fourteenth embodiments, the tapering angles of the outer surfaces of the second valve portions 71, 75, and 81 may differ from the tapering angles of the inner surfaces of the second valve holes 13, 33, and 83.

In the seventeenth embodiment, the helical groove 17 may be formed on the inner surface of the second valve hole 13. This also reduces noise generated by the refrigerant near the outlet of the expansion valve.

The expansion valve and the refrigeration device of the present invention are applicable to an integrated air conditioner, a separate-type air conditioner, or a multi-type air conditioner, and are also applicable to refrigeration circuits other than the air conditioners (e.g., refrigeration circuits such as refrigerators).

The invention claimed is:

1. An expansion valve comprising:
   a valve body;
   an inlet port and an outlet port formed in the valve body;
   a valve chamber formed in the valve body;
   a refrigerant flow passage formed in the valve body and connecting the inlet port and the outlet port through the valve chamber;
   a valve member accommodated in the valve chamber;
   a first throttle formed in the refrigerant flow passage; and
   a second throttle formed in the refrigerant flow passage downstream from the first throttle; and
   an enlarged space portion is formed in the refrigerant flow passage between the first throttle and the second throttle,
   wherein the valve body has a first partition wall partitioning a refrigerant flow in the refrigerant flow passage and a second partition wall partitioning a refrigerant flow downstream from the first partition wall, with the first partition wall including a first valve hole and the second partition wall including a second valve hole;
   the valve member is formed from a rod-shaped member, and the rod-shaped member has an outer surface including a first valve portion forming the first throttle with the first valve hole and a second valve portion forming the second throttle with the second valve hole;
   the first throttle having an open degree that is variable by advancing and retracting the first valve portion with respect to a valve seat of the first valve hole;
   a groove is formed in an outer surface of the second valve portion or an inner surface of the second valve hole;
   at least either one of the outer surface of the second valve portion and the inner surface of the second valve hole is tapered toward a distal end of the valve member;
   the second throttle includes a passage formed between the groove and the outer surface of the second valve portion or the inner surface of the second valve hole that faces the groove, and
   the enlarged space portion is formed by increasing the inner diameter of part of the refrigerant flow passage.

2. The expansion valve according to claim 1, wherein:
   the first throttle is fully closable by advancing and retracting the first valve portion with respect to the valve seat of the first valve hole.

3. The expansion valve according to claim 1, wherein:
   the outer surface of the second valve portion and the inner surface of the second valve hole are both tapered toward the distal end of the valve member.

4. The expansion valve according to claim 3, wherein:
   the outer surface of the second valve portion and the inner surface of the second valve hole are tapered at the same angle.

5. The expansion valve according to claim 1, wherein:
   the groove is formed in the outer surface of the second valve portion.

6. The expansion valve according to claim 1, wherein:
   the valve member has a distal end portion defining the first valve portion and an intermediate portion defining the second valve portion.

7. The expansion valve according to claim 1, wherein:
   the first valve portion includes a guide portion for deflecting a refrigerant flow that passes through the first valve hole in the enlarged space portion.

8. The expansion valve according to claim 1, wherein:
   the groove is a helical groove, and the second throttle is formed by a helical passage formed between the helical groove and the outer surface of the second valve portion or the inner surface of the second valve hole that faces the helical groove.

9. The expansion valve according to claim 1, wherein:
   the valve member includes a distal end portion defining the first valve portion and an intermediate portion defining the second valve portion, the second valve portion and the inner surface of the second valve hole are tapered toward the distal end of the valve member, the groove is a helical groove, and the second valve portion has a downstream end portion arranged in the second valve hole within a range from a minimum value to a maximum value of the open degree of the second throttle.

10. The expansion valve according to claim 1, wherein:
    the valve member has a distal end portion defining the first valve portion and an intermediate portion defining the second valve portion, the outer surface of the second valve portion and the inner surface of the second valve hole are tapered toward the distal end of the valve member, the groove is a helical groove, and the second valve portion has an upstream end portion arranged in the enlarged space portion within a range from a minimum value to a maximum value of the open degree of the second throttle.

11. The expansion valve according to claim 9, wherein:
    the helical groove is formed in the outer surface of the second valve portion.

12. The expansion valve according to claim 9, wherein:
    the second valve portion and the second valve hole are tapered at the same angle.

13. The expansion valve according to claim 9, wherein:
    the tapering angle of the first valve portion is greater than the tapering angle of the second valve hole.

14. The expansion valve according to claim 13, wherein:
    the tapering angle of the second valve hole is in a range of 5 to 60 degrees.

15. The expansion valve according to claim 9, wherein:
    a gap formed between the first valve portion and the first valve hole near an outlet of the first throttle is smaller than a minimum value of a gap formed between the second valve portion and the second valve hole of the second throttle.

16. The expansion valve according to claim 9, wherein:
    a connecting portion arranged on the valve member downstream from the second valve portion, the connecting portion having a diameter that is smaller than the diameter of a largest outer part of the second valve portion.

17. The expansion valve according to claim 16, wherein:
    the valve member includes a second varying diameter joint portion formed between the connecting portion and the second valve portion, with the second varying diameter joint portion being tapered from the largest outer part toward the connecting portion.

18. The expansion valve according to claim 9, wherein:
a first varying diameter joint portion formed between an upstream end portion of the second valve portion and a downstream end portion of the first valve portion, with the first varying diameter joint portion being tapered from the second valve portion toward the first valve portion, and the tapering angle of the first varying diameter joint portion being greater than the tapering angle of the first valve portion.

19. The expansion valve according to claim 8, wherein:
the second valve portion is tapered toward the distal end of the valve member by forming the helical groove on the outer surface of the rod-shaped member and then cutting the top of a thread of the helical groove.

20. The expansion valve according to claim 8, wherein:
the second valve portion is formed by tapering the outer surface of the rod-shaped member toward the distal end of the valve member and then machining the helical groove in the outer surface of the rod-shaped member.

21. The expansion valve according to claim 8, wherein:
the helical groove is one of a plurality of helical grooves.

22. The expansion valve according to claim 1, wherein:
the valve seat protrudes from a wall surface of the first partition wall in the vicinity of the first valve hole.

23. The expansion valve according to claim 1, wherein:
the groove includes a plurality of linear grooves extending in an advancing and retracting direction of the valve member, and the second throttle includes a plurality of independent linear passages formed between the linear grooves and a surface facing the linear grooves.

24. The expansion valve according to claim 23, wherein:
the linear grooves are formed at regular intervals.

25. A refrigeration device comprising:
the expansion valve according to claim 1.

26. An expansion valve comprising:
a valve body;
a refrigerant flow passage formed in the valve body;
a valve member accommodated in the valve body and formed from a rod-shaped member;
a first throttle formed in the refrigerant flow passage; and
a second throttle formed in the refrigerant flow passage upstream from the first throttle; and
an enlarged space portion is formed in the refrigerant flow passage between the first throttle and the second throttle,
wherein the valve body has a first partition wall partitioning a refrigerant flow in the refrigerant flow passage and a second partition wall partitioning a refrigerant flow upstream from the first partition wall, with the first partition wall including a first valve hole and the second partition wall including a second valve hole;
the valve member has a tapered outer surface, and the valve member includes a first valve portion contactable with a valve seat of the first valve hole and a second valve portion facing an inner surface of the second valve hole;
the first throttle having an open degree that is variable by advancing and retracting the first valve portion with respect to the first valve hole;
the second throttle is formed by a helical passage defined between a helical groove formed in an outer surface of the second valve portion or an inner surface of the second valve hole and the outer surface of the second valve portion or the inner surface of the second valve hole;
at least either one of the outer surface of the second valve portion and the inner surface of the second valve hole is tapered toward a distal end of the valve member; and
the enlarged space portion is formed by increasing the inner diameter of part of the refrigerant flow passage.

27. The expansion valve according to claim 26, wherein:
the first throttle is fully closable by advancing and retracting the first valve portion with respect to the valve seat of the first valve hole.

28. The expansion valve according to claim 26, wherein:
the outer surface of the second valve portion and the inner surface of the second valve hole are both tapered toward the distal end of the valve member.

29. The expansion valve according to claim 28, wherein:
the outer surface of the second valve portion and the inner surface of the second valve hole are tapered at the same angle.

30. The expansion valve according to claim 26, wherein:
the helical groove is formed in the outer surface of the second valve portion.

31. The expansion valve according to claim 26, wherein:
the valve member has a distal end portion defining the first valve portion and an intermediate portion defining the second valve portion.

32. The expansion valve according to claim 26, wherein:
the valve member has a distal end portion defining the first valve portion and an intermediate portion defining the second valve portion, the outer surface of the second valve portion and the inner surface of the second valve hole are tapered toward the distal end of the valve member, and the second valve portion has an upstream end portion arranged in the second valve hole within a range from a minimum value to a maximum value of the open degree of the second throttle.

33. The expansion valve according to claim 26, wherein:
the valve member has a distal end portion defining the first valve portion, the valve member has an intermediate portion defining the second valve portion, the outer surface of the second valve portion and the inner surface of the second valve hole are tapered toward the distal end of the valve member, and the second valve portion has a downstream end portion arranged in the enlarged space portion within a range from a minimum value to a maximum value of the open degree of the second throttle.

34. The expansion valve according to claim 32, wherein:
the helical groove is formed in the outer surface of the second valve portion.

35. The expansion valve according to claim 32, wherein:
the second valve portion and the second valve hole are tapered at the same angle.

36. The expansion valve according to claim 32, wherein:
the tapering angle of the first valve portion is greater than the tapering angle of the second valve hole.

37. The expansion valve according to claim 36, wherein:
the tapering angle of a tapered surface in the second valve hole is in a range of 5 to 60 degrees.

38. The expansion valve according to claim 32, wherein:
a gap formed between the first valve portion and the first valve hole near an inlet of the first throttle is smaller than a minimum value of a gap formed between the second valve portion and the second valve hole of the second throttle.

39. The expansion valve according to claim 32, wherein:
a connecting portion formed in the valve member upstream from the second valve portion, with the connecting portion having a diameter that is smaller than a diameter of a largest outer part of the second valve portion.

40. The expansion valve according to claim 39, wherein:
a second varying diameter joint portion formed between the connecting portion and the second valve portion, with the second varying diameter joint portion being tapered from the largest outer part of the second valve portion toward an outer part of the connecting portion.

41. The expansion valve according to claim 32, wherein:
a first varying diameter joint portion formed between a downstream end portion of the second valve portion and an upstream end portion of the first valve portion, with the first varying diameter joint portion being tapered from the second valve portion toward the first valve portion, and the tapering angle of the first varying diameter joint portion being greater than the tapering angle of the first valve portion.

42. The expansion valve according to claim 26, wherein:
the helical groove is formed by forming the outer surface of the second valve portion or the inner surface of the second valve hole parallel to a central axis of the valve member, then threading the outer surface of the second valve portion or the inner surface of the second valve hole, and further cutting a top of a thread of the outer surface of the second valve portion or the inner surface of the second valve hole so that a surface defined by the top of the thread forms a tapered surface.

43. The expansion valve according to claim 26, wherein:
the helical groove is formed by tapering an outer surface of the valve member and threading the machined surface.

44. The expansion valve according to claim 26, wherein:
the valve seat protrudes from a wall surface of the first partition wall in the vicinity of the first valve hole.

45. The expansion valve according to claim 26, wherein:
the helical groove is one of a plurality of helical grooves.

46. A refrigeration device comprising:
the expansion valve according to claim 26.

* * * * *